US008304134B2

(12) United States Patent
Miyake et al.

(10) Patent No.: US 8,304,134 B2
(45) Date of Patent: Nov. 6, 2012

(54) POLYMER ELECTROLYTE COMPOSITION, POLYMER ELECTROLYTE MEMBRANE, MEMBRANE ELECTRODE ASSEMBLY AND SOLID POLYMER ELECTROLYTE-BASED FUEL CELL

(75) Inventors: Naoto Miyake, Tokyo (JP); Yuichi Inoue, Tokyo (JP)

(73) Assignee: Asahi Kasei E-materials Corporation, Tokyo (JP)

(*) Notice: Subject to any disclaimer, the term of this patent is extended or adjusted under 35 U.S.C. 154(b) by 537 days.

(21) Appl. No.: 12/528,129

(22) PCT Filed: Feb. 21, 2008

(86) PCT No.: PCT/JP2008/052982
§ 371 (c)(1),
(2), (4) Date: Aug. 21, 2009

(87) PCT Pub. No.: WO2008/102851
PCT Pub. Date: Aug. 28, 2008

(65) Prior Publication Data
US 2010/0015496 A1  Jan. 21, 2010

(30) Foreign Application Priority Data
Feb. 21, 2007  (JP) ................. 2007-040491

(51) Int. Cl.
H01M 8/10 (2006.01)
H01M 4/88 (2006.01)
H01M 4/90 (2006.01)

(52) U.S. Cl. ........ 429/492; 429/479; 429/491; 429/493; 429/494; 502/101; 502/150; 502/159; 502/168; 502/172; 502/216; 502/224

(58) Field of Classification Search .......... 429/492, 429/479, 491, 493, 494; 502/101, 150, 159, 502/168, 172, 216, 224
See application file for complete search history.

(56) References Cited

U.S. PATENT DOCUMENTS

| | | | | |
|---|---|---|---|---|
| 2,513,188 | A | 6/1950 | Macallum | 260/79 |
| 3,257,357 | A | 6/1966 | Stamatoff | 260/47 |
| 3,257,358 | A | 6/1966 | Stamatoff | 260/47 |
| 3,274,165 | A | 9/1966 | Lenz et al. | 260/79 |
| 3,306,874 | A | 2/1967 | Hay | 260/47 |
| 3,306,875 | A | 2/1967 | Hay | 260/47 |
| 3,919,177 | A | 11/1975 | Campbell | 260/79.1 |
| 4,011,200 | A | 3/1977 | Yonemitsu et al. | 260/47 |
| 4,255,523 | A | 3/1981 | Ukihashi et al. | 521/27 |
| 5,342,920 | A | 8/1994 | Imai et al. | 528/388 |
| 5,523,181 | A | 6/1996 | Stonehart et al. | 429/192 |
| 7,125,626 | B2 | 10/2006 | Kato | 429/42 |
| 2005/0053822 | A1 | 3/2005 | Miyake et al. | 429/33 |
| 2006/0141315 | A1 | 6/2006 | Murata et al. | 429/33 |
| 2006/0199062 | A1 | 9/2006 | Yanagita et al. | 429/33 |
| 2006/0292415 | A1 | 12/2006 | Song et al. | 429/30 |
| 2007/0020507 | A1 | 1/2007 | Kim et al. | 429/42 |

FOREIGN PATENT DOCUMENTS

| | | |
|---|---|---|
| EP | 0 094 679 B1 | 11/1986 |
| GB | 1160660 | 8/1969 |
| JP | 44-27671 | 11/1969 |
| JP | 45-3368 | 2/1970 |
| JP | 46-27255 | 7/1971 |
| JP | 50-51197 | 7/1975 |
| JP | 52-12240 | 4/1977 |
| JP | 52-17880 | 5/1977 |
| JP | 53-149881 | 12/1978 |
| JP | 61-225217 | 10/1986 |
| JP | 63-152628 | 6/1988 |
| JP | 63-61337 | 11/1988 |
| JP | 5-222196 | 8/1993 |
| JP | 6-111827 | 4/1994 |
| JP | 8-162132 | 6/1996 |
| JP | 08-253587 | 10/1996 |
| JP | 09-219206 | 8/1997 |
| JP | 11-106656 | 4/1999 |
| JP | 2006-054076 | 2/2006 |
| JP | 2006-128095 | 5/2006 |
| JP | 2006155924 A * | 6/2006 |
| JP | 2007-112907 | 5/2007 |
| WO | WO 2005/000949 A1 | 1/2005 |
| WO | WO 2005/103161 A1 | 11/2005 |
| WO | WO 2006/028190 A1 | 3/2006 |

OTHER PUBLICATIONS

Denchi, N., *Kagaku One Point*, Kyoritsu Shuppan Co., Ltd., pp. 39-41, 56-63, and 164, 1992.

Hu, K. et al.; *Preparation of Novel Heterogeneous Cation-Permeable Membranes from Blends of Sulfonated Poly(phenylene sulfide) and Poly(ether sulfone)*; Journal of Applied Polymer Science, vol. 91, pp. 167-174, 2004.

Kasei, A., *Research and Development of Solid Polymer Type Fuel Cell (Studies for Establishing Accelerated Evaluation Techniques for Membranes)*, New Energy and Industrial Technology Developement Organization, pp. 55-57, 2002.

Montoneri, E., *The Products of the Reaction of Polyphenylene Sulfide with $SO_3$ and $SOCl_2$*, Journal of Polymer Science: Part A: Polymer Chemistry, vol. 27, pp. 3043-3051, 1989.

Schauer, J. et al.; *The Preparation of Microporous Membranes from Blends of Poly(2,6-dimethyl-1, 4-phenylene oxide) and Sulfonated Poly(2,6-dimmethyl-1, 4-phenylene oxide)*, Journal of Applied Polymer Science, vol. 73, pp. 161-167, 1999.

Van Nostrand et al., *Fuel Cell Handbook*, Chapter 1, pp. 3-15, 1989.

Wang, C. et al., *Preparation and Characterization of Sulfonated Poly(phenylence oxide)*, Polymer Journal, vol. 27, No. 2, pp. 173-178. 1995.

* cited by examiner

*Primary Examiner* — Douglas Mc Ginty
(74) *Attorney, Agent, or Firm* — Morgan, Lewis & Bockius LLP

(57) ABSTRACT

The present invention provides a polymer electrolyte composition comprising a polymer electrolyte (A component) having an ion exchange capacity of from 0.5 to 3.0 meq/g, a compound (B component) having a thioether group and a compound (C component) having an azole ring, wherein a mass ratio (B/C) of the B component to the C component is 1/99 to 99/1, and a total content of the B component and C component is 0.01 to 50% by mass based on the solid content in the polymer electrolyte composition.

40 Claims, No Drawings

POLYMER ELECTROLYTE COMPOSITION, POLYMER ELECTROLYTE MEMBRANE, MEMBRANE ELECTRODE ASSEMBLY AND SOLID POLYMER ELECTROLYTE-BASED FUEL CELL

TECHNICAL FIELD

The present invention relates to a polymer electrolyte composition, a polymer electrolyte membrane, a membrane electrode assembly, a solid polymer electrolyte-based fuel cell and the like.

BACKGROUND ART

A fuel cell is a cell for taking out an electric energy which is obtained by directly converting a chemical energy of a fuel by oxidizing hydrogen or methanol or the like. The fuel cell is attracting attention as a clean electric energy supply source. In particular, since a solid polymer electrolyte-based fuel cell works at a lower temperature as compared with others, it is expected as an automobile alternative power source, a domestic cogeneration system, a portable generator or the like.

The solid polymer electrolyte-based fuel cell comprises at least a membrane electrode assembly in which a gas diffusion electrode obtained by laminating an electrode catalyst layer and a gas diffusion layer is joined on each of both surfaces of a proton exchange membrane. The term "proton exchange membrane" as used herein refers to a material having a strongly acidic group such as a sulfonic acid group and a carboxylic acid group in the polymer chain and having a property of selectively passing a proton. As the proton exchange membrane, there is suitably used a perfluoro-based proton exchange membrane represented by Nafion (registered trademark, produced by Du Pont) having high chemical stability.

During the operation of a fuel cell, a fuel (for example, hydrogen) is supplied to the gas diffusion electrode on the anode side, an oxidant (for example, oxygen or air) is supplied to the gas diffusion electrode on the cathode side, and both electrodes are connected through an external circuit, thereby activating the fuel cell. Specifically, when hydrogen is used as the fuel, the hydrogen is oxidized on an anode catalyst to produce a proton. This proton passes through a proton conductive polymer in the anode catalyst layer, then moves in the proton exchange membrane and passes through a proton conductive polymer in the cathode catalyst layer to reach on a cathode catalyst. On the other hand, an electron produced simultaneously with the proton by the oxidation of hydrogen passes through the external circuit to reach the gas diffusion electrode on the cathode side. On the cathode catalyst, the proton and the oxygen in the oxidant react to produce water, and an electric energy is taken out at this time.

In this case, the proton exchange membrane is also required to act as a gas barrier wall. If the proton exchange membrane has a high gas permeability, the hydrogen on the anode side leaks toward the cathode side and the oxygen on the cathode side leaks toward the anode side, that is, cross leak occurs, thereby producing a so-called chemical short state and unabling to take out a good voltage.

The solid polymer electrolyte-based fuel cell is usually operated in the vicinity of 80° C. in order to obtain a high output property. However, when the fuel cell is used for vehicle applications, assuming the vehicle travel in the summer season, the fuel cell is required to be operable even under high-temperature low-humidification conditions (an operation temperature in the vicinity of 100° C. with 50° C. humidification (corresponding to a humidity of 12 RH %)). However, if a fuel cell is operated using a conventional perfluoro-based proton exchange membrane for a long time under high-temperature low-humidification conditions, there occurred a problem that pinholes are produced in the proton exchange membrane and cross leak is caused. That is, a sufficiently high durability is not obtained by the conventional perfluoro-based proton exchange membrane.

As the method for improving the durability of the perfluoro-based proton exchange membrane, there are disclosed a method for improving the durability by reinforcement using a fibrillated polytetrafluoroethylene (PTFE) (Patent Documents 1 and 2), a method for improving the durability by reinforcement using a PTFE porous membrane subjected to stretch treatment (Patent Document 3) and a method for improving the durability by reinforcement by adding inorganic particles (Patent Documents 4, 5 and 6).

In addition, Patent Document 7 discloses a blended membrane of a perfluorosulfonic acid polymer and a polybenzimidazole and a method for improving chemical stability.

Further, Patent Document 8 discloses a proton exchange membrane containing polyphenylene sulfide particles.

Patent Document 1: Japanese Patent Laid-Open No. 53-149881
Patent Document 2: Japanese Patent Publication No. 63-61337
Patent Document 3: Japanese Patent Laid-Open No. 8-162132
Patent Document 4: Japanese Patent Laid-Open No. 6-111827
Patent Document 5: Japanese Patent Laid-Open No. 9-219206
Patent Document 6: U.S. Pat. No. 5,523,181
Patent Document 7: International Publication No. 2005/000949
Patent Document 8: International Publication No. 2005/103161

DISCLOSURE OF THE INVENTION

Problems to be Solved by the Invention

However, from the viewpoint of achieving durability sufficiently high to solve the above problems, the methods disclosed in Patent Documents 1 to 8 still had room for improvement.

In addition, in the method disclosed in Patent Document 8, coarse particles mainly composed of polyphenylene sulfide were present in a proton exchange membrane in some cases. If the coarse particles are present, in some cases, there was formed an uneven membrane in which a resin mainly composed of polyphenylene sulfide is non-uniformly dispersed, and there was still room for improvement from the viewpoint of obtaining a desired effect.

An object of the present invention is to provide a polymer electrolyte membrane or the like, which has, for example, high chemical stability and a high durability even under high-temperature low-humidification conditions (for example, an operation temperature in the vicinity of 100° C. with 50° C. humidification (corresponding to a humidity of 12 RH %)).

Means for Solving the Problems

As a result of earnest studies to solve the above problems, the present inventors have found that a polymer electrolyte composition, which comprises a polymer electrolyte (A component), a compound having a thioether group (B component)

and a compound having an azole ring (C component), has high chemical stability, and a polymer electrolyte membrane comprising the polymer electrolyte composition can solve the above problems, and have completed the present invention.

That is, the present invention is as follows:

(1)

A polymer electrolyte composition comprising:
a polymer electrolyte (A component) having an ion exchange capacity of from 0.5 to 3.0 meq/g;
a compound (B component) having a thioether group; and
a compound (C component) having an azole ring, wherein a mass ratio (B/C) of the B component to the C component is 1/99 to 99/1 and a total content of the B component and C component is 0.01 to 50% by mass based on a solid content in the polymer electrolyte composition.

(2)

The polymer electrolyte composition according to item (1), wherein the content of the B component is 0.005 to 30% by mass and the content of the C component is 0.005 to 20% by mass based on the solid content in the polymer electrolyte composition.

(3)

The polymer electrolyte composition according to item (1) or (2), wherein the B component is a polyphenylene sulfide resin.

(4)

The polymer electrolyte composition according to any one of items (1) to (3), wherein the C component is a polyazole-based compound.

(5)

The polymer electrolyte composition according to any one of items (1) to (4), wherein the C component is one or two or more polyazole-based compounds selected from the group consisting of a polyimidazole-based compound, a polybenzimidazole-based compound, a polybenzobisimidazole-based compound, a polybenzoxazole-based compound, a polyoxazole-based compound, a polythiazole-based compound and a polybenzothiazole-based compound.

(6)

The polymer electrolyte composition according to any one of items (1) to (5), wherein the C component is a polybenzimidazole-based compound.

(7)

The polymer electrolyte composition according to any one of items (1) to (6), wherein the C component is poly[2,2'-(m-phenylene)-5,5'-bibenzimidazole].

(8)

The polymer electrolyte composition according to any one of items (1) to (7), wherein the A component is a perfluorocarbon polymer compound having a structural unit represented by the following general formula [1];

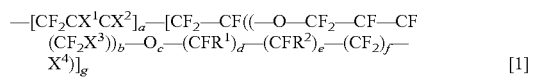

[1]

(wherein each of $X^1$, $X^2$ and $X^3$ is independently selected from the group consisting of a halogen atom and a perfluoroalkyl group having 1 to 3 carbon atoms, $X^4$ represents COOZ, $SO_3Z$, $PO_3Z_2$ or $PO_3$ HZ (wherein Z represents a hydrogen atom, an alkali metal atom, an alkaline earth metal atom or amines ($NH_4$, $NH_3R_1$, $NH_2R_1R_2$, $NHR_1R_2R_3$, or $NR_1R_2R_3R_4$), and each of $R_1$, $R_2$, $R_3$ and $R_4$ is independently selected from the group consisting of an alkyl group and an arene group; when $X^4$ represents $PO_3Z_2$, Z may be the same or different.), each of $R^1$ and $R^2$ is independently selected from the group consisting of a halogen atom, a perfluoroalkyl group or fluorochloroalkyl group having 1 to 10 carbon atoms, a and g are positive numbers satisfying $0 \leq a < 1$, $0 < g \leq 1$ and $a+g=1$, b is an integer of 0 to 8, c is 0 or 1, and each of d, e and f is independently an integer of 0 to 6 (with the proviso that d, e and f are simultaneously not 0)).

(9)

The polymer electrolyte composition according to any one of items (1) to (8), further comprising a polyphenylene ether resin (D component) and/or an epoxy group-containing compound (E component), and wherein a mass ratio (D/E) of the D component to the E component is 0/100 to 100/0 and a total content of the D component and the E component is 0.01 to 20% by mass based on the solid content in the polymer electrolyte composition.

(10)

The polymer electrolyte composition according to any one of items (1) to (9), wherein a resin (X component) composed mainly of the B component is dispersed in an island state and satisfies the following expression [2];

$$0(\%) \leq \text{cumulative volume (volume basis) of } X \text{ component having a particle diameter of } 10\mu m \text{ or more} \leq 5(\%)$$ [2]

(11)

The polymer electrolyte composition according to item (10), wherein the X component has an average particle diameter of from 0.01 to 2.0 μm.

(12)

The polymer electrolyte composition according to item (10) or (11), wherein the cumulative volume ratio (R1/R2) (volume basis) of a component (R1) having a particle diameter of less than 1 μm to a component (R2) having a particle diameter of 1 μm or more of the X component is 20/80 to 99/1.

(13)

A polymer electrolyte membrane formed from the polymer electrolyte composition according to any one of items (1) to (12).

(14)

A process for producing a polymer electrolyte membrane, comprising the steps of:
dissolving or suspending a polymer electrolyte (A component) having an ion exchange capacity of from 0.5 to 3.0 meq/g, a compound (B component) having a thioether group and a compound (C component) having an azole ring in one or more protic solvents to obtain a polymer electrolyte composition in which a mass ratio (B/C) of the B component to the C component is from 1/99 to 99/1 and a total of the content of the B component and the C component is from 0.01 to 50% by mass based on the solid content in the polymer electrolyte composition;
casting the polymer electrolyte composition; and
removing the solvents to form a membrane.

(15)

The process for producing the polymer electrolyte membrane according to item (14), comprising the steps of:

(1) mixing the B component into a polymer electrolyte precursor followed by melt extrusion to obtain a molded product;

(2) subjecting the molded product to hydrolysis treatment and further to acid treatment to convert the polymer electrolyte precursor into the A component;

(3) dissolving or suspending the acid-treated molded product in the one or more protic solvents to obtain a solution or suspension containing the A component and the B component;

(4) mixing together the solution or suspension obtained in the above step (3) and a solution or suspension of the C component to obtain the polymer electrolyte composition;

(5) casting the polymer electrolyte composition; and (6) removing the solvents to form a membrane.

(16)

The process for producing the polymer electrolyte membrane according to item (15), wherein the step (1) further comprises mixing a polyphenylene ether resin (D component) and/or an epoxy group-containing compound (E component).

(17)

The process for producing the polymer electrolyte membrane according to item (15) or (16), further comprising filtering the solution or suspension obtained in the step (3).

(18)

A polymer electrolyte membrane obtained by the process according to any one of items (14) to (17).

(19)

The polymer electrolyte membrane according to item (13) or (18), further comprising a reinforcing material selected from the group consisting of an inorganic material, an organic material and an organic-inorganic hybrid material.

(20)

The polymer electrolyte membrane according to item (19), wherein the reinforcing material is a fibrous material.

(21)

The polymer electrolyte membrane according to item (19), wherein the reinforcing material is a continuous support.

(22)

A membrane electrode assembly comprising a polymer electrolyte membrane according to any one of items (13) and (18) to (21).

(23)

An electrode catalyst layer produced from an electrode catalyst composition comprising:

a composite particle in which an electrode catalyst particle is supported on a conductive particle and a polymer electrolyte composition comprising:

a polymer electrolyte (A component) having an ion exchange capacity of from 0.5 to 3.0 meq/g, a compound (B component) having a thioether group and a compound (C component) having an azole ring, wherein a content of the composite particle in the electrode catalyst layer is 20 to 95% by mass based on the electrode catalyst layer, a mass ratio (B/C) of the B component to the C component is 1/99 to 99/1, and a total content of the B component and the C component is 0.01 to 50% by mass based on the solid content in the polymer electrolyte composition.

(24)

The electrode catalyst layer according to item (23), wherein the B component is a polyphenylene sulfide resin.

(25)

The electrode catalyst layer according to item (23) or (24), wherein the C component is a polyazole-based compound.

(26)

The electrode catalyst layer according to any one of items (23) to (25), wherein the C component is a polyazole salt.

(27)

The electrode catalyst layer according to any one of items (23) to (26), wherein the C component is one or two or more polyazole-based compounds selected from the group consisting of a polyimidazole-based compound, a polybenzimidazole-based compound, a polybenzobisimidazole-based compound, a polybenzoxazole-based compound, a polyoxazole-based compound, a polythiazole-based compound and a polybenzothiazole-based compound.

(28)

The electrode catalyst layer according to any one of items (23) to (27), wherein the C component is a polybenzimidazole-based compound.

(29)

The electrode catalyst layer according to any one of items (23) to (28), wherein the C component is poly[2,2'-(m-phenylene)-5,5'-bibenzimidazole].

(30)

The electrode catalyst layer according to any one of items (23) to (29), wherein the A component is a perfluorocarbon polymer compound having a structural unit represented by the following general formula [1];

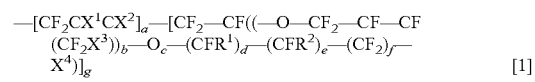

[1]

(wherein each of $X^1$, $X^2$ and $X^3$ is independently selected from the group consisting of a halogen atom and a perfluoroalkyl group having 1 to 3 carbon atoms, $X^4$ represents $COOZ$, $SO_3Z$, $PO_3Z_2$ or $PO_3HZ$ (wherein Z represents a hydrogen atom, an alkali metal atom, an alkaline earth metal atom or amines ($NH_4$, $NH_3R_1$, $NH_2R_1R_2$, $NHR_1R_2R_3$, or $NR_1R_2R_3R_4$), and each of $R_1$, $R_2$, $R_3$ and $R_4$ is independently selected from the group consisting of an alkyl group and an arene group; when $X^4$ represents $PO_3Z_2$, Z may be the same or different), each of $R^1$ and $R^2$ is independently selected from the group consisting of a halogen atom, a perfluoroalkyl group or fluorochloroalkyl group having 1 to 10 carbon atoms, a and g are positive numbers satisfying $0 \leq a < 1$, $0 < g \leq 1$ and $a+g=1$, b is an integer of 0 to 8, c is 0 or 1, and d, e and f are each independently an integer of 0 to 6 (with the proviso that d, e and f are simultaneously not 0)).

(31)

The electrode catalyst layer according to any one of items (23) to (30), further comprising a polyphenylene ether resin (D component) and/or an epoxy group-containing compound (E component), and wherein a mass ratio (D/E) of the D component to the E component is 0/100 to 100/0, and a total content of the D component and the E component is 0.01 to 20% by mass based on the solid content in the polymer electrolyte composition.

(32)

A process for producing an electrode catalyst layer, comprising the steps of:

dissolving or suspending a polymer electrolyte (A component) having an ion exchange capacity of from 0.5 to 3.0 meq/g, a compound (B component) having a thioether group and a compound (C component) having an azole ring in one or more protic solvents to obtain a polymer electrolyte composition in which a mass ratio (B/C) of the B component to the C component is 1/99 to 99/1 and a total content of the B component and the C component is 0.01 to 50% by mass based on the solid content in the polymer electrolyte composition;

preparing an electrode catalyst composition in which a composite particle where an electrode catalyst particle is supported on a conductive particle is dispersed in the polymer electrolyte composition at a ratio of from 1 to 100% by mass based on the polymer electrolyte composition; and drying and solidifying the electrode catalyst composition.

(33)

An electrode catalyst layer obtained by the process according to item (32).

(34)

A polymer electrolyte solution or a polymer electrolyte suspension comprising a polymer electrolyte (A component) having an ion exchange capacity of from 0.5 to 3.0 meq/g, a compound (B component) having a thioether group and a compound (C component) having an azole ring, wherein the A component, the B component and the C component are dissolved or suspended in one or more protic solvents, a mass ratio (B/C) of the B component to the C component is 1/99 to 99/1 and a total content of the B component and the C component is 0.01 to 50% by mass based on the solid contents in the polymer electrolyte solution or the polymer electrolyte suspension.

(35)

The polymer electrolyte solution or the polymer electrolyte suspension according to item (34), wherein the resin (X component) composed mainly of the B component having an average particle diameter of from 0.01 to 2.0 μm is dispersed.

(36)

The polymer electrolyte solution or polymer electrolyte suspension according to item (34) or (35), wherein the A component is a perfluorocarbon polymer compound having a structural unit represented by the following general formula [1];

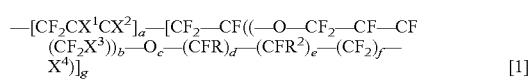

[1]

(wherein each of $X^1$, $X^2$ and $X^3$ is independently selected from the group consisting of a halogen atom and a perfluoroalkyl group having 1 to 3 carbon atoms, $X^4$ represents $COOZ$, $SO_3Z$, $PO_3Z_2$ or $PO_3HZ$ (wherein Z represents a hydrogen atom, an alkali metal atom, an alkaline earth metal atom or amines ($NH_4$, $NH_3R_1$, $NH_2R_1R_2$, $NHR_1R_2R_3$, or $NR_1R_2R_3R_4$), and each of $R_1$, $R_2$, $R_3$ and $R_4$ is independently selected from the group consisting of an alkyl group and an arene group; when $X^4$ represents $PO_3Z_2$, Z may be the same or different), each of $R^1$ and $R^2$ is independently selected from the group consisting of a halogen atom, a perfluoroalkyl or fluorochloroalkyl group having 1 to 10 carbon atoms, a and g are positive numbers satisfying $0 \leq a < 1$, $0 < g \leq 1$ and $a+g=1$, b is an integer of 0 to 8, c is 0 or 1, and d, e and f are each independently an integer of 0 to 6 (with the proviso that d, e and f are simultaneously not 0)).

(37)

A membrane electrode assembly comprising the electrode catalyst layer according to any one of items (23) to (31) and (33).

(38)

A membrane electrode assembly comprising the polymer electrolyte membrane according to any one of items (13) and (18) to (21) and the electrode catalyst layer according to any one of items (23) to (31) and (33).

(39)

A solid polymer electrolyte-based fuel cell comprising the membrane electrode assembly according to item 22, 37 or 38.

Advantages of the Invention

A polymer electrolyte composition of the present invention has high chemical stability, and a polymer electrolyte membrane comprising the polymer electrolyte composition also has high chemical stability and has a high durability even under high-temperature low-humidification conditions (for example, an operation temperature in the vicinity of 100° C. with 50° C. humidification (corresponding to a humidity of 12 RH %)).

In the present invention, the durability is significantly increased by incorporating two components, the compound (B component) having the thioether group and the compound (C component) having the azole ring into the polymer electrolyte composition as compared to the case where each of the compounds is incorporated alone. As for the reason, it is believed that in the electrolyte membrane disclosed in Patent Document 8, platinum eluted or precipitated in the membrane cannot be securely inactivated by reduction or adsorption because the reactive area of the polyphenylene sulfide resin is not sufficiently large and a sufficient durability is not obtained because the electrolyte component is deteriorated by the hydrogen peroxide generated on the platinum which cannot be trapped and peroxide radicals resulting from the hydrogen peroxide. Considering that platinum in the electrode catalyst is eluted and precipitated, and hydrogen peroxide and peroxide radicals resulting from the hydrogen peroxide are generated in the chain reaction on the eluted platinum, it is believed that the durability is significantly increased by cutting the source of the peroxide radical generation pathway which leads to deterioration of the electrolyte component by incorporating both the compound having the thioether group and the compound having the azole ring and by using the supplementary function of the compound having the azole ring against hydrogen peroxide and peroxide radicals resulting from the hydrogen peroxide which cannot be prevented by Patent Document 8 which discloses that only the compound having the thioether group is incorporated. In addition, in order to effectively perform the function of the two components, the compound (B component) having the thioether group and the compound (C component) having the azole ring, the polymer electrolyte composition may have a high durability by controlling the two components in a specific dispersion state even under high-temperature low-humidification conditions where the elution and precipitation of platinum are frequently observed

BEST MODE FOR CARRYING OUT THE INVENTION

Hereinafter, there will be described the best mode for carrying out the present invention (hereinafter, described as "the present embodiment"). In addition, the present invention is not limited to the following embodiments, and various changes and modifications may be made within the gist of the invention.

(Polymer Electrolyte (A Component))

As the polymer electrolyte (A component) having an ion exchange capacity of from 0.5 to 3.0 meq/g used in the present embodiment, preferred is, for example, a perfluorocarbon polymer compound having an ion exchange group and a hydrocarbon-based polymer compound having an aromatic ring in the molecule in which an ion exchange group is introduced.

Examples of the hydrocarbon-based polymer compound having the aromatic ring in the molecule may include polyphenylene sulfide, polyphenylene ether, polysulfone, polyethersulfone, polyether ether sulfone, polyether ketone, polyether ether ketone, polythioether ether sulfone, polythioether ketone, polythioether ether ketone, polybenzimidazole, polybenzoxazole, polyoxadiazole, polybenzoxadinone, polyxylylene, polyphenylene, polythiophene, polypyrrole, polyaniline, polyacene, polycyanogen, polynaphthylidine, polyphenylene sulfide sulfone, polyphenylenesulfone, polyimide, polyetherimide, polyesterimide, polyamidoimide, polyarylate, aromatic polyamide, polystyrene, polyester and polycarbonate.

Among these, from the viewpoint of heat resistance, oxidation resistance and hydrolysis resistance, preferable examples of the hydrocarbon-based polymer compound having the aromatic ring within the molecule may include polyphenylene sulfide, polyphenylene ether, polysulfone, polyethersulfone, polyether ether sulfone, polyether ketone, polyether ether ketone, polythioether ether sulfone, polythioether ketone, polythioether ether ketone, polybenzimidazole, polybenzoxazole, polyoxadiazole, polybenzoxadinone, polyxylylene, polyphenylene, polythiophene, polypyrrole, polyaniline, polyacene, polycyanogen, polynaphthylidine, polyphenylene sulfide sulfone, polyphenylenesulfone, polyimide and polyetherimide. Examples of the ion exchange group introduced into the hydrocarbon-based polymer compound having the aromatic ring in the molecule may include a sulfonic acid group, a sulfonimide group, a sulfonamide group, a carboxylic acid group and a phosphoric acid group, preferably a sulfonic acid group.

As the polymer electrolyte (A component) used in the present embodiment, from the viewpoint of chemical stability, preferred is a perfluorocarbon polymer compound having an ion exchange group.

Examples of the perfluorocarbon polymer compound having the ion exchange group may include a perfluorocarbon sulfonic acid resin, a perfluorocarbon carboxylic acid resin, a perfluorocarbon sulfonimide resin, a perfluorocarbon sulfonamide resin, a perfluorocarbon phosphoric acid resin, or an amine salt thereof or a metal salt thereof.

The polymer electrolyte (A component) used in the present embodiment specifically includes a perfluorocarbon polymer compound having a structural unit represented by the following general formula [1].

$$-[CF_2CX^1CX^2]_a-[CF_2-CF((-O-CF_2-CF(CF_2X^3))_b-O_c-(CFR^1)_d-(CFR^2)_e-(CF_2)_f-X^4)]_g- \quad [1]$$

wherein each of $X^1$, $X^2$ and $X^3$ are independently selected from the group consisting of a halogen atom and a perfluoroalkyl group having 1 to 3 carbon atoms, and examples of the halogen atom may include a fluorine atom, a chlorine atom, a bromine atom and an iodine atom and preferred is a fluorine atom or a chlorine atom.

$X^4$ represents COOZ, $SO_3Z$, $PO_3Z_2$ or $PO_3HZ$. Z represents an alkali metal atom such as a hydrogen atom, a lithium atom, a sodium atom or a potassium atom; an alkaline earth metal atom such as a calcium atom or magnesium atom, or amines ($NH_4$, $NH_3R_1$, $NH_2R_1R_2$, $NHR_1R_2R_3$, $NR_1R_2R_3R_4$). Each of $R_1$, $R_2$, $R_3$ and $R_4$ are independently selected from the group consisting of an alkyl group and an arene group. When $X^4$ represents $PO_3Z_2$, Z may be the same or different.).

Examples of the alkyl group may includes, but not particularly limited to, a monovalent group represented by the general formula: $C_nH_{2n+1}$ (n represents an integer of 1 or more and preferably is an integer of 1 to 20, more preferably an integer of 1 to 10) and specifically includes a methyl group, an ethyl group, a propyl group, a butyl group, a pentyl group, a hexyl group and the like. In addition, examples of the arene group includes, but not particularly limited to, a residual group obtained by removing one hydrogen atom from the nucleus of aromatic hydrocarbon (a single ring or condensed ring having 6 to 16 carbon atoms) and specifically includes a phenyl group, a tolyl group, a naphthyl group and the like.

Each of $R^1$ and $R^2$ are independently selected from the group consisting of a halogen atom, a perfluoroalkyl or fluorochloroalkyl group having 1 to 10 carbon atoms. Examples of the halogen atom may include a fluorine atom, a chlorine atom and an iodine atom and preferred is a fluorine atom or a chlorine atom.

a and g are positive numbers satisfying $0 \leq a < 1$, $0 < g \leq 1$ and a+g=1.

b is an integer of 0 to 8.

c is 0 or 1.

d, e and f are each independently an integer of 0 to 6 (with the proviso that d, e and f are simultaneously not 0).

In the above general formula [1], when Z represents the alkaline earth metal, for example, as with $(COO)_2Z$ or $(SO_3)_2Z$, two $X^4$s may form a salt with an alkaline earth metal.

Among these, especially preferred is a perfluorocarbon sulfonic acid polymer represented by the following general formulas [3] or [4] or a metal salt thereof:

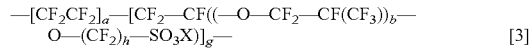
[3]

wherein a and g are positive numbers satisfying $0 \leq a < 1$, $0 < g \leq 1$ and a+g=1, b is an integer of 1 to 3, h is an integer of 1 to 8, and x represents a hydrogen atom or an alkali metal atom;

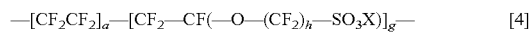
[4]

wherein a and g are positive numbers satisfying $0 \leq a < 1$, $0 < g \leq 1$ and a+g=1, h is an integer of 1 to 8, and x is a hydrogen atom or an alkali metal atom.

The perfluorocarbon polymer compound having the ion exchange group used in the present embodiment may be produced, for example, by polymerizing a precursor polymer represented by the following general formula [5], followed by subjecting the resulting product to alkali hydrolysis, acid treatment and the like:

$$-[CF_2CX^1CX^2]_a-[CF_2-CF((-O-CF_2-CF(CF_2X^3))_b-O_c-(CFR^1)_d-(CFR^2)_e-(CF_2)_f-X^5)]_g- \quad [5]$$

wherein each of $X^1$, $X^2$ and $X^3$ are independently selected from the group consisting of a halogen atom and a perfluoroalkyl group having 1 to 3 carbon atoms. Examples of the halogen atom may include a fluorine atom, a chlorine atom, a bromine atom and an iodine atom, and preferred is a fluorine atom or a chlorine atom.

$X^5$ represents $COOR^3$, $COR^4$ or $SO_2R^4$. $R^3$ represents a hydrocarbon-based alkyl group having 1 to 3 carbon atoms. $R^4$ represents a halogen atom.

Each of $R^1$ and $R^2$ are independently selected from the group consisting of a halogen atom, a perfluoroalkyl or fluorochloroalkyl group having 1 to 10 carbon atoms. Examples of the halogen atom may include a fluorine atom, a chlorine atom, a bromine atom and an iodine atom and preferred is a fluorine atom or a chlorine atom.

a and g are positive numbers satisfying $0 \leq a < 1$, $0 < g \leq 1$ and a+g=1.

b is an integer of 0 to 8.

c is 0 or 1.

d, e and f are each independently an integer of 0 to 6 (with the proviso that d, e and f are simultaneously not 0).

The precursor polymer represented by the above general formula [5] may be produced, for example, by copolymerizing a fluorinated olefin compound and a fluorinated vinyl compound.

Herein, examples of the fluorinated olefin compound may include a compound represented by the following general formula [1a]:

wherein $X^1$ and $X^2$ are as described above in the general formula [5].

Examples of the fluorinated olefin compound may specifically include $CF_2=CF_2$, $CF_2=CFCl$ and $CF_2=CCl_2$.

In addition, examples of the fluorinated vinyl compound may include a compound represented by the following general formula [1b]:

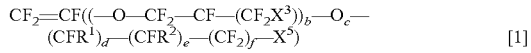

wherein $X^3$, $X^5$, $R^1$, $R^2$, a, b, c, d, e, f and g are as described in the general formula [5].

Examples of the fluorinated vinyl compound may specifically include $CF_2=CFO(CF_2)_j—SO_2F$, $CF_2=CFOCF_2CF(CF_3)O(CF_2)_j—SO_2F$, $CF_2=CF(CF_2)_j—SO_2F$, $CF_2=CF(OCF_2CF(CF_3))_j—(CF_2)_{j-1}—SO_2F$, $CF_2=CFO(CF_2)_j—CO_2R$, $CF_2=CFOCF_2CF(CF_3)O((CF_2)_j—CO_2R$, $CF_2=CF(CF_2)_j—CO_2R$, $CF_2=CF(OCF_2CF(CF_3))_j—(CF_2)_2—CO_2R$ and the like (j is an integer of 1 to 8 and R represents a hydrocarbon-based alkyl group having 1 to 3 carbon atoms.)

The precursor polymer as described above may be synthesized by the well-known means. Examples of the synthesis method may include, but not particularly limited to, the following methods:

(i) a method of using a polymerization solvent such as fluorine-containing hydrocarbon and polymerizing a fluorinated vinyl compound and a fluorinated olefin gas in a state where the compound and the gas are filled and dissolved in the polymerization solvent (solution polymerization). Examples of the used fluorine-containing hydrocarbon may include trichlorotrifluoroethane or 1,1,1,2,3,4,4,5,5,5-decafluoropentane, which are collectively called chlorofluorocarbons.

(ii) a method of polymerizing a fluorinated vinyl compound using the fluorinated vinyl compound itself as a polymerization solvent without using a solvent such as fluorine-containing hydrocarbon (bulk polymerization).

(iii) a method of using an aqueous solution of a surfactant as a polymerization solvent and polymerizing a fluorinated vinyl compound and a fluorinated olefin gas in a state where the compound and the gas filled and dissolved in the polymerization solvent (emulsification polymerization).

(iv) a method of using an aqueous solution of an auxiliary emulsifier such as a surfactant and alcohol and polymerizing a fluorinated vinyl compound and a fluorinated olefin gas in a state where the compound and the gas are introduced and emulsified in the aqueous solution (miniemulsion polymerization, microemulsion polymerization).

(v) a method of using an aqueous solution of a suspension stabilizer and polymerizing a fluorinated vinyl compound and a fluorinated olefin gas in a state where the compound and the gas are introduced and suspended in the aqueous solution (suspension polymerization).

In the present embodiment, a melt mass-flow rate (hereinafter may be abbreviated as "MFR") can be used as an indicator of a polymerization degree of a precursor polymer. In the present embodiment, the precursor polymer has an MFR of preferably 0.01 or more, more preferably 0.1 or more and still more preferably 0.3 or more. The upper limit of the MFR is not limited, but is preferably 100 or less, more preferably 10 or less, and still more preferably 5 or less. If the MFR is set in a range of from 0.01 to 100, molding such as membrane formation may be suitably performed.

The precursor polymer prepared as described above is subjected to hydrolysis treatment in a basic reaction solution, sufficiently washed with warm water and the like, and then subjected to acid treatment. By the hydrolysis treatment and acid treatment, for example, a perfluorocarbon sulfonic acid resin precursor is protonated to give a perfluorocarbon sulfonic acid resin, which is $SO_3H$ product.

If the polymer electrolyte (A component) used in the present embodiment is adjusted to have an ion exchange capacity of 3.0 meq/g or less, swelling of the polymer electrolyte membrane can be reduced under high-temperature high-humidification conditions during the operation of the fuel cell. If the swelling is reduced, it is possible to reduce such a problem that the strength of the polymer electrolyte membrane is decreased and wrinkles are formed to cause the membrane to be peeled from the electrode and further a problem that the gas barrier properties are lowered. On the other hand, if the ion exchange capacity is adjusted to 0.5 meq/g or more, it is possible to suitably maintain the power generation capacity of a fuel cell equipped with the polymer electrolyte membrane. The polymer electrolyte (A component) has an ion exchange capacity of preferably from 0.5 to 3.0 meq/g, more preferably from 0.65 to 2.0 meq/g and still more preferably from 0.8 to 1.5 meq/g.

(Compound (B Component) Having Thioether Group)

The compound (B component) having a thioether group used in the present embodiment is a compound comprising a chemical structure represented by $—(R—S)_n—$ (S represents a sulfur atom, R represents a hydrocarbon group and n is an integer of 1 or more), and examples thereof may include dialkylthioethers such as dimethylthioether, diethylthioether, dipropylthioether, methylethylthioether and methylbutylthioether; cyclic thioethers such as tetrahydrothiophene and tetrahydropyran; and aromatic thioethers such as methylphenylsulfide, ethylphenylsulfide, diphenylsulfide and dibenzylsulfide. These may be a monomer or a polymer such as, for example, polyphenylene sulfide (PPS).

As the compound (B component) having a thioether group, from the viewpoint of durability in the chemical structure, preferred is a polymer (oligomer, polymer) in which n is an integer of 10 or more, and more preferred is a polymer in which n is an integer of 1000 or more.

As the compound (B component) having the thioether group used in the present embodiment, from the viewpoint of chemical stability, preferred is a polyphenylene sulfide resin.

The polyphenylene sulfide resin is a polyphenylene sulfide resin which contains the paraphenylene sulfide skeleton in an amount of preferably 70 mol % or more and more preferably 90 mol % or more.

The method for producing the polyphenylene sulfide resin is not particularly limited as long as it satisfies the above conditions. Examples of the method for producing the polyphenylene sulfide resin may include a method of polymerizing a halogen-substituted aromatic compound (p-dichlorobenzene and the like) in the presence of sulfur and sodium carbonate; a method of polymerizing a halogen-substituted aromatic compound in a polar solvent in the presence of sodium sulfide or sodium hydrogen sulfide and sodium hydroxide; a method of polymerizing a halogen-substituted aromatic compound in a polar solvent in the presence of hydrogen sulfide and sodium hydroxide or sodium aminoalkanoate; or a self-condensation of p-chlorothiophenol. Among these, preferred is a method of reacting sodium sulfide with p-dichlorobenzene in an amide-based solvent such as N-methylpyrrolidone and dimethylacetamide, or a sulfone-based solvent such as sulfolane.

Examples of the method for producing the polyphenylene sulfide resin may include the methods described in U.S. Pat. No. 2,513,188, Japanese Patent Publication Nos. 44-27671, 45-3368 and 52-12240, Japanese Patent Laid-Open No. 61-225217, U.S. Pat. No. 3,274,165, British Patent No. 1160660, Japanese Patent Publication No. 46-27255, Belgian Patent No. 29437 and Japanese Patent Laid-Open No. 5-222196, and the methods described in prior arts cited in these patent publications.

The amount of oligomer extracted with methylene chloride from the polyphenylene sulfide resin is usually from 0.001 to 0.9% by mass, preferably from 0.001 to 0.8% by mass and more preferably from 0.001 to 0.7% by mass.

Herein, when the amount of oligomer extracted with methylene chloride is in the above range, it means that the amount of oligomer (approximately from 10- to 30-mer) in the polyphenylene sulfide resin is small. If the amount of oligomer extracted is set in the above range, it is preferable because bleeding-out is not likely to occur during membrane formation.

The amount of oligomer extracted with methylene chloride can be measured by the following method. That is, 5 g of polyphenylene sulfide powder is added to 80 ml of methylene chloride, and the resulting mixture is subjected to soxhlet extraction for 4 hours, followed by cooling to room temperature. The methylene chloride solution after extraction is transferred to a weighing bottle. Further, the vessel used for the extraction is washed separately three times with 60 ml in total of methylene chloride, and the washing solution is recovered in the weighing bottle. Thereafter, methylene chloride in the weighing bottle is evaporated and removed by heating to approximately 80° C. and the residue is weighed. From the amount of the residue, the ratio of the amount of oligomer present in the polyphenylene sulfide can be determined.

The content of the —SX group (S represents a sulfur atom and X represents an alkali metal or a hydrogen atom) which the polyphenylene sulfide resin has is usually from 10 to 10000 µmol/g, preferably from 15 to 10000 µmol/g and more preferably from 20 to 10000 µmol/g.

When the —SX group concentration is in the above range, it means that the polyphenylene sulfide resin has a large number of reaction active sites. If using the polyphenylene sulfide resin in which the —SX group concentration satisfies the above range, the dispersibility of the polyphenylene sulfide resin is improved because the miscibility with the polymer electrolyte (A component) of the present embodiment is increased, thereby enabling to obtain a high durability under high-temperature low-humidification conditions.

The quantification of the —SX group can be performed by the following method. That is, the polyphenylene sulfide powder is previously dried at 120° C. for 4 hours, and then 20 g of the dried polyphenylene sulfide powder is added to 150 g of N-methyl-2-pyrrolidone. The resulting mixture is mixed under vigorous stirring at room temperature for 30 minutes so that powder aggregates are eliminated to form a slurry state. After filtering the slurry, the filtered residue is washed repeatedly seven times using 1 liter of warm water at approximately 80° C. every time. The filter cake obtained is again slurried in 200 g of purified water, and then the slurry is adjusted to a pH of 4.5 by adding 1N hydrochloric acid. Subsequently, the slurry is stirred at 25° C. for 30 minutes and is filtered, followed by washing six times with 1 liter of warm water at approximately 80° C. The resulting filter cake is again slurried in 200 g of purified water, followed by titrating with 1N sodium hydroxide to determine the amount of the —SX group present in polyphenylene sulfide from the amount of sodium hydroxide consumed.

Examples of the specific process for producing polyphenylene sulfide in which the amount of oligomer extracted with methylene chloride is from 0.001 to 0.9% by mass and the —SX group concentration is from 10 to 10000 µmol/g may include the processes described in Japanese Patent Laid-Open No. 8-253587 and Japanese Patent Laid-Open No. 11-106656 and the like.

From the viewpoint of fabricability, the B component has a melt viscosity at 320° C. (a value measured by maintaining the B component at 300° C. under a load of 196N with L/D (L: orifice length, D: orifice inner diameter)=10/1 for 6 minutes) using a flow tester) of preferably from 1 to 10000 poise and more preferably from 100 to 1000 poise.

As the B component, there may be suitably used a compound in which an acidic functional group is introduced into a benzene ring of polyphenylene sulfide. As the acidic functional group to be introduced, preferred are a sulfonic acid group, a phosphoric acid group, a carboxylic acid group, a maleic acid group, a maleic anhydride group, a fumaric acid group, an itaconic acid group, an acrylic acid group and a methacrylic acid group, and more preferred is a sulfonic acid group.

The method for introducing the acidic functional group is not particularly limited and the acidic functional group is introduced by the general method. For example, a sulfonic acid group can be introduced by using a sulfonating agent such as sulfuric anhydride and fuming sulfuric acid, under known conditions. Specifically, a sulfonic acid group can be introduced by the conditions described in K. Hu, T. Xu, W. Yang, Y. Fu, Journal of Applied Polymer Science, Vol. 91 and E. Montoneri, Journal of Polymer Science: Part A: Polymer Chemistry, Vol. 27, 3043-3051 (1989). In addition, there is also suitably used a compound in which the acidic functional group introduced is replaced with a metal salt or an amine salt. Examples of the metal salt may preferably include alkali metal salts such as a sodium salt and a potassium salt, or alkaline earth metal salts such as a calcium salt.

In the present embodiment, the term "the resin (X component) mainly composed of a compound (B component) having a thioether group" refers to a resin comprising a compound (B component) having a thioether group which is a main component in a range of from 50 to 100% by mass, preferably from 60 to 100% by mass, more preferably from 70 to 100% by mass and still more preferably 80% by mass or more.

In the present embodiment, the resin (X component) mainly composed of the compound (B component) having a thioether group is preferably dispersed in an island state.

In the present embodiment, the term "dispersed in an island state" means that the X component is dispersed by forming a island part of a so-called sea-island structure.

Herein, for the X component dispersed in an island state, the cumulative volume (volume basis) of the X component having a particle diameter of 10 µm or more is preferably from 0(%) to 5(%), more preferably from 0(%) to 4(%), further more preferably from 0(%) to 3(%), still further more preferably from 0(%) to 2(%) and especially preferably from 0(%) to 1(%). If the cumulative volume is set to 5% or less, the durability of the polymer electrolyte composition may be significantly increased.

In the present embodiment, examples of the method for adjusting the "cumulative volume (volume basis) of the X component having a particle diameter of 10 µm or more" may include a method of applying high shear during melt-kneading to pulverize and finely disperse the X component, a method of filtering a solution before forming a membrane to remove coarse particles, and the like.

The cumulative volume (volume basis) in the present embodiment is defined by the following method.

Specifically, the polymer electrolyte composition or the polymer electrolyte membrane is dissolved or suspended by the method described later and the volume-based particle size distribution of particles in the solution is measured using a laser diffraction/scattering-based particle size distribution measuring apparatus. The volume ratio occupied by particles having a particle diameter of 10 μm or more in the particle size distribution is defined as the cumulative volume (volume basis) assuming that the total particle volume is 100.

As described above, when the polymer electrolyte composition or the polymer electrolyte membrane cannot be dissolved or suspended, a ratio may be defined by the following method. An ultra-thin specimen is prepared from the polymer electrolyte composition or the polymer electrolyte membrane and is dyed with a dyeing agent such as ruthenium tetroxide by the conventional method. The dyed specimen is observed by a transmission electron microscope to measure the particle diameter of the dyed phase. In the ultra-thin specimen, an optional 20×20 μm square visual field is printed directly or from a negative on a photograph and then is taken into an image analysis apparatus. Thereafter, the equivalent spherical diameter is used as the particle diameter assuming that each particle is spherical. The volume ratio occupied by particles having the particle diameter of 10 μm or more in the volume-based particle size distribution is defined as the cumulative volume (volume basis) assuming that the total particle volume is 100. However, when the dyeing border is unclear in inputting the image data to the image analysis apparatus from the photograph, a tracing of the photograph is made, and the image data is inputted to the image analysis apparatus by using the drawing.

In the present embodiment, from the viewpoint of suitably achieving an effect such as enhanced lifetime by improving dispersibility, the X component has an average particle diameter of preferably from 0.01 to 2.0 μm, more preferably from 0.01 to 1.0 μm, still more preferably from 0.01 to 0.5 μm and still further more preferably from 0.01 to 0.1 μm.

In the present embodiment, examples of the method of adjusting the above-described state "the X component has an average particle diameter of 0.01 to 2.0 μm" may include a method of applying high shear during melt-kneading to pulverize and finely disperse the X component, a method of filtering a solution before forming a membrane to remove coarse particles, and the like.

The average particle diameter in the present embodiment is defined by the following method.

Specifically, the polymer electrolyte composition or the polymer electrolyte membrane is dissolved or suspended by the method described later, and the average particle diameter (a value obtained by arithmetically averaging the volume-based frequency distribution) measured by a laser diffraction/scattering-based particle size distribution measuring apparatus is used as the average particle diameter of particles in the solution.

As described above, when the polymer electrolyte composition or the polymer electrolyte membrane cannot be dissolved or suspended, the ratio may be defined by the following method. A thin specimen is prepared from the polymer electrolyte composition or the polymer electrolyte membrane and is dyed with a dyeing agent such as ruthenium tetroxide by the conventional method. The dyed specimen is observed by a transmission electron microscope to measure the particle diameter of the dyed phase. In the thin specimen, an optional 20×20 μm square visual field is printed directly or from a negative on a photograph and then is taken into an image analysis apparatus. Thereafter, the equivalent spherical diameter is used as the particle diameter assuming that each particle is spherical. The average particle diameter at this time is used as a value obtained by arithmetically averaging the volume-based frequency distribution. However, when the dyeing border is unclear in inputting the image data to the image analysis apparatus from the photograph, a tracing of the photograph is made, and the image data is inputted to the image analysis apparatus by using the drawing.

In the present embodiment, the cumulative volume ratio (volume basis) (R1/R2) of a component (R1) having an average particle diameter of less than 1 μm to a component (R2) having an average particle diameter of 1 μm or more of the resin (X component) mainly composed of the compound (B component) having a thioether group is preferably from 20/80 to 99/1. Since the effect of the present embodiment such as enhanced lifetime may be obtained by improving dispersibility, the cumulative volume ratio (R1/R2) of the component (R1) to the component (R2) is more preferably from 30/70 to 99/1, still more preferably from 40/60 to 99/1 and still further more preferably from 50/50 to 99/1.

In the present embodiment, examples of the method of adjusting the above-described state "the cumulative volume ratio (R1/R2) (volume basis) is 20/80 to 99/1" may include a method of applying high shear during melt-kneading to pulverize and finely disperse the X component, a method of filtering a solution before forming a membrane to remove coarse particles, and the like.

The cumulative volume ratio (volume basis) in the present embodiment is defined by the following method.

Specifically, the polymer electrolyte composition or the polymer electrolyte membrane is dissolved or suspended by the method described later and the volume-based particle size distribution of particles in the solution is measured using a laser diffraction/scattering-based particle size distribution measuring apparatus. The volume ratio occupied by particles having a particle diameter of less than 1 μm is defined as R1, and the volume ratio occupied by particles having a particle diameter of 1 μm or more is defined as R2 (=100−R1) in the particle size distribution, assuming that the total particle volume is 100. And the ratio (R1/R2) is defined as the cumulative volume ratio (volume basis) in the present embodiment.

As described above, when the polymer electrolyte composition or the polymer electrolyte membrane cannot be dissolved or suspended, the ratio (R1/R2) may be defined by the following method. An ultra-thin specimen is prepared from the polymer electrolyte composition or the polymer electrolyte membrane and is dyed with a dyeing agent such as ruthenium tetroxide by the conventional method. The dyed specimen is observed by a transmission electron microscope to measure the particle diameter of the dyed phase. In the ultra-thin specimen, an optional 20×20 μm square visual field is printed directly or from a negative on a photograph and then is taken into an image analysis apparatus. Thereafter, the equivalent spherical diameter is used as the particle diameter assuming that each particle is spherical. The volume ratio occupied by particles having a particle diameter of less than 1 μm in the volume-based particle size distribution is defined as R1 and the volume ratio occupied by particles having a particle diameter of 1 μm or more is defined as R2 (=100−R1), assuming that the total particle volume is 100. And the ratio (R1/R2) is defined as the cumulative volume ratio (volume basis) in the present embodiment. However, when the dyeing border is unclear in inputting the image data to the image analysis apparatus from the photograph, a tracing of the photograph is made, and the image data is inputted to the image analysis apparatus by using the drawing.

(Compound (C Component) Having Azole Ring)

The compound (C component) having an azole ring used in the present embodiment is a compound having a 5-membered heterocyclic structure containing one or more nitrogen atoms in the ring. In addition, the 5-membered heterocyclic ring may contain an oxygen atom, a sulfur atom and the like, in addition to a nitrogen atom.

Examples of an azole ring having two atoms other than carbon atoms may include imidazole(1,3-diazole), oxazole, thiazole, selenazole, pyrazole(1,2-diazole), isoxazole, isothiazole and the like; examples of an azole ring having three atoms may include 1H-1,2,3-triazole(1,2,3-triazole), 1,2,3-oxadiazole(diazoanhydride), 1,2,3-thiadiazole and the like, and examples of an azole ring having four atoms may include 1H-1,2,3,4-tetrazole(1,2,3,4-tetrazole), 1,2,3,5-oxatriazole, 1,2,3,5-thiatriazole and the like.

The azole ring as described above may be condensed with an aromatic ring such as a benzene ring.

Preferable examples of the compound having a 5-membered heterocyclic structure, from the viewpoint of obtaining heat resistance, may include compounds in which divalent aromatic groups such as a p-phenylene group, a m-phenylene group, a naphthalene group, a diphenylene ether group, a diphenylene sunfone group, a biphenylene group, a terphenyl group and a 2,2-bis(4-carboxyphenylene)hexafluoropropane group are bonded with a 5-membered heterocyclic ring.

As the compound (C component) having the azole ring used in the present embodiment, from the viewpoint of chemical stability, preferred is a polyazole-based compound.

Examples of the polyazole-based compound may include polymers such as a polyimidazole-based compound, a polybenzimidazole-based compound, a polybenzobisimidazole-based compound, a polybenzoxazole-based compound, a polyoxazole-based compound, a polythiazole-based compound and a polybenzothiazole-based compound. Specifically, as the C component, preferably used is a polybenzimidazole.

As the C component, from the viewpoint of chemical stability, preferred is a polyazole salt.

Preferable examples of the polyazole salt may include compounds in which at least a part of a polyazole-based compound is a polyazole metal salt, and a polyazole alkali metal salt or a polyazole alkaline earth metal salt. Specifically, preferred is an alkali metal salt with a monovalent ion such as $Li^+$, $Na^+$, $K^+$, $Rb^+$, $Cs^+$ and $Fr^+$, and as the polyazole salt, more preferred is a polyazole Na salt.

The amount of the metal ion is preferably 0.01 to 100 times equivalents (0.01 times equivalents or more and 100 times equivalents or less), more preferably 0.05 to 50 times equivalents and still more preferably 0.1 to 10 times equivalents, based on the total equivalent number of nitrogen present in the heterocyclic ring of the polyazole-based compound.

The polyazole-based compound (including the following modified polyazole-based compound) and/or the polyazole salt may be used alone or as a mixture of two or more of them.

The C component which can be used has a weight average molecular weight of from 300 to 500000 in terms of polystyrene as measured by GPC.

The polyazole-based compound may be a modified polyazole-based compound in which an ion exchange group is introduced into an azole ring by the following general modification method. The modified polyazole-based compound includes a polyazole-based compound in which one or more groups such as amino, quaternary ammonium, carboxyl, sulfonic acid and phosphonic acid groups are introduced. If an anionic ion-exchange group is introduced into a polyazole-based compound, it is useful because the ion-exchange capacity of the entire polymer electrolyte composition of the present embodiment can be increased, consequently enabling to obtain high output during the operation of the fuel cell. The modified polyazole-based compound preferably has an ion exchange capacity of from 0.01 to 3.0 meq/g.

The method for modification of the polyazole-based compound is not particularly limited. Examples of the modification method may include a method of introduction of an ion exchange group into a polyazole compound using fuming sulfuric acid, concentrated sulfuric acid, sulfuric anhydride and a complex thereof, sultones such as propanesultone, α-bromotoluenesulfonic acid and chloroalkylphosphonic acid, and the like, and a method of polymerization by incorporating an ion-exchange group during synthesis of a monomer of a polyazole-based compound.

From the viewpoint of obtaining a higher durability, the C component is also preferably dispersed in a perfluorocarbon sulfonic acid resin in an island state. Here, the term "dispersed in an island state" means that the C component is dispersed by forming a island part of a so-called sea-island structure.

It can be confirmed whether or not the polyazole-based compound is "dispersed in an island state", by the following method.

That is, it can be confirmed whether or not a sea-island structure is observed by observing the 15×15 μm area of a cross section in the thickness direction of the polymer electrolyte composition or the polymer electrolyte membrane by a transmission electron microscope (hereinafter may be abbreviated as "TEM"). In addition, in this case, it is observed whether or not a state where black island shaped particles (island phase or island particles) are dispersed in the gray or white sea phase (continuous phase) is observed on the TEM image when the TEM observation is performed without carrying out dyeing treatment. The shape of the island phase (island particles) is not particularly limited but is circular, elliptical, polygonal, amorphous and the like. Further, the island particles have a diameter (or major axis or maximum diameter) of preferably in a range of from 0.01 to 10 μm. In the sea-island structure, the contrast of the black island particles is mainly caused by a polyazole-based compound, and the portion of the white sea (continuous phase) is mainly caused by a perfluorocarbon sulfonic acid resin.

In the case where the C component forms the island phase, a ratio of the total area of the island phase in the area of the entire region (sum of the area of the sea phase and the total area of the island phase) is preferably from 0.1 to 70%, more preferably from 1 to 70% and still more preferably from 5 to 50%. In addition, the density of the island particles preferably is 0.1 to 100 particles per 1 $\mu m^2$.

The total area of the island phase and the density of the island particles can be measured using the following methods.

The TEM image is read and digitized by a scanner. Based on the digitized data, the gray levels of each part (gray scale 256 gradation levels) is measured using the image analyzer IP1000 (manufactured by Asahi Kasei Corporation), and a histogram is prepared in which the horizontal axis indicates a gray scale and the longitudinal axis indicates the number of particles. When the TEM image shows a sea/island structure or a structure similar thereto (that is, neither in the case of only a black part mainly composed of a polyazole-based compound, nor in the case of only a white part mainly composed of a perfluorocarbon sulfonic acid resin), the histogram indicates a bimodal distribution. Binarization is performed by using a gray scale value in the valley of bimodal distribution as a threshold value, and judging a part having a gray scale value larger than the threshold value as black and a part having a gray scale value smaller than the threshold value as white. (That is, a gray part in the TEM photograph is judged as either white or black by the above standard, and the gray part judged as black is subjected to blackening processing.) In the binarized image, the predetermined region (a part corresponding to a region having a size of 15×15 μm of the membrane cross section) is separated between a black island particle part of a sea-island structure mainly corresponding to a polyazole-based compound and a sea part mainly corresponding to a perfluorocarbon sulfonic acid resin by image processing using the image analyzer IP1000. The number of island particles present in the region having a size of 15×15 μm and the total area of the island particles are measured. In addition, the number of island particles per 1 μm$^2$ in the region having a size of 15×15 μm is determined and used as the density of island particles.

When the C component has the sea-island structure, it means that a part mainly composed of a polyazole-based compound is uniformly and finely dispersed in a part mainly composed of a perfluorocarbon sulfonic acid resin, and higher durability may be obtained.

In the present embodiment, a part mainly composed of a polyazole-based compound means a part containing a polyazole-based compound which is a main component in a range of from 50 to 100% by mass, preferably from 60 to 100% by mass, more preferably from 70 to 100% by mass and still more preferably 80% by mass or more.

In addition, a part mainly composed of a perfluorocarbon sulfonic acid resin means a part containing a perfluorocarbon sulfonic acid resin which is a main component in a range of from 50 to 100% by mass, preferably from 60 to 100% by mass, more preferably 70 to 100% by mass and still more preferably 80% by mass or more.

In the present embodiment, the A component and the C component, for example, may be ionically bonded to form an acid-base ion complex, or may be covalently bonded. That is, for example, a sulfonic acid group in the A component and a nitrogen atom contained in each reaction group such an imidazole group, an oxazole group and a thiazole group in the C component may be ionically bonded or covalently bonded.

It can be confirmed whether or not an ionic bond or a covalent bond occurs using a Fourier transform infrared spectrometer (hereinafter may be abbreviated as "FT-IR").

When the polymer electrolyte composition or the polymer electrolyte membrane of the present embodiment is measured using a FT-IR, if a spectrum is observed in which the peak position inherent to a polymer electrolyte or the peak position inherent to a polyazole-based compound is shifted, it can be judged that a part of the polymer electrolyte is reacted with a part of the polyazole-based compound.

For example, when poly[2,2'-(m-phenylene)-5,5'-bibenzimidazole] (hereinafter may be abbreviated as "PBI") is used as the C component, the shifted absorption peaks derived from chemical bonding between a sulfonic group in the A component and an imidazole group in PBI are observed in the vicinity of 1458 cm$^{-1}$, 1567 cm$^{-1}$ and 1634 cm$^{-1}$.

In the present embodiment, when carrying out a dynamic viscoelasticity test for the polymer electrolyte composition to which PBI is added, the peak temperature (Tg) of the loss tangent (Tan δ) obtained during temperature rising from room temperature to 200° C. becomes higher as compared with a polymer electrolyte composition to which PBI is not added. It is known that the rising of Tg occurs when the sulfonic acid group of the polymer electrolyte is crosslinked by a metal ion or an organic ion (a chemical bond occurs). It is considered that a chemical bond (ionic bond or covalent bond) between the A component and the C component occurs by adding the C component to the A component, and the C component constrains the molecular motion of the A component, and thus Tg rises. The rising of Tg may improve heat resistance or mechanical strength of the polymer electrolyte composition of the present embodiment. For this reason, consequently, it is presumed that the rising of Tg exhibits an effect of providing a higher durability during the operation of the fuel cell.

In the present embodiment, a mass ratio (B/C) between the B component and the C component is from 1/99 to 99/1. From the viewpoint of the balance between chemical stability and durability (dispersibility), the mass ratio (B/C) is preferably from 5/95 to 95/5, more preferably from 10/90 to 90/10 and still more preferably from 20/80 to 80/20.

In the present embodiment, a ratio of the total mass of the B component and the C component in the solid content in the polymer electrolyte composition is from 0.01 to 50% by mass. From the viewpoint of the balance between ion conductivity and durability (dispersibility), the ratio is preferably from 0.05 to 45% by mass, more preferably from 0.1 to 40% by mass, still more preferably from 0.2 to 35% by mass and still further more preferably from 0.3 to 30% by mass.

Herein, the solid content in the polymer electrolyte composition means the content based on the total mass of the A component, B component and C component, and when a component such as the D component and/or E component is contained, the solid content means the content in the total mass containing them.

In the present embodiment, a ratio of the A component to the solid content in the polymer electrolyte composition is preferably from 50 to 99.99% by mass. From the viewpoint of ion conductivity and durability (dispersibility), the ratio is more preferably from 55 to 99.95% by mass, still more preferably from 60 to 99.90% by mass, still further more preferably from 65 to 99.80% by mass and especially preferably from 60 to 99.7% by mass.

In the present embodiment, the content of the B component in the polymer electrolyte composition is preferably from 0.005 to 30% by mass, and the content of the C component is preferably from 0.005 to 20% by mass. From the viewpoint of the balance between the achievement of a good ion conductivity and durability in the fuel cell operation under high-temperature low-humidification conditions, it is more preferable that the content of the B component is from 0.01 to 28% by mass and the content of the C component is from 0.01 to 18% by mass, it is still more preferable that the content of the B component is from 0.1 to 25% by mass and the content of the C component is from 0.1 to 15% by mass, it is still further more preferable that the content of the B component is from 0.5 to 23% by mass and the content of the C component is from 0.5 to 13% by mass, and it is especially preferable that the content of the B component is from 1 to 20% by mass and the content of the C component is from 1 to 10% by mass.

The polymer electrolyte composition of the present embodiment may further contain a polyphenylene ether resin (D component) and/or an epoxy group-containing compound (E component). The polyphenylene ether resin (D component) and/or the epoxy group-containing compound (E component) may act as a compatibilizing agent to improve the dispersibility of the B component, and thus have a benefit of further improving the durability of the polymer electrolyte composition.

(Polyphenylene Ether Resin (D Component))

The polyphenylene ether resin (D component) used in the present embodiment is not particularly limited as long as it is a so-called polyphenylene ether resin, but preferred is a phenol homopolymer or copolymer containing a structural unit represented by the following formula [6] in an amount of 70 mol % or more and preferably 90 mol % or more:

[Formula 1]

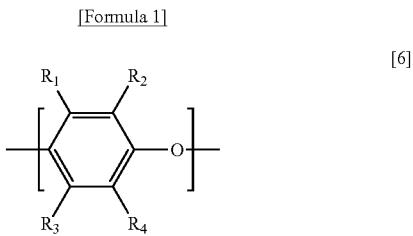

[6]

wherein each of R1, R2, R3 and R4 is independently selected from the group consisting of hydrogen, halogen, a linear or branched hydrocarbon-based alkyl group having from 1 to 7 carbon atoms, a phenyl group, a haloalkyl group, an aminoalkyl group, a hydrocarbon-based alkyloxy group and a halohydrocarbonoxy group in which at least two carbon atoms separate a halogen atom and an oxygen atom, and may be the same or different from one another.

Specific examples of the polyphenylene ether resin (D component) may include poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether), a copolymer of 2,6-dimethylphenol with other monovalent phenols (for example, 2,3,6-trimethylphenol and 2-methyl-6-butylphenol), and a copolymer of 2,6-dimethylphenol with divalent phenols (for example, 3,3',5,5'-tetramethyl bisphenol A).

Among these, from the viewpoint of productivity, preferred are poly(2,6-dimethyl-1,4-phenylene ether), a copolymer of 2,6-dimethylphenol with 2,3,6-trimethylphenol and a copolymer of 2,6-dimethylphenol with 3,3',5,5'-tetramethyl bisphenol A.

From the viewpoint that the D component is easily modified, the D component preferably has a phenolic hydroxyl group at a molecular chain terminal and the position may be either one terminal or both terminals.

In addition, the D component has a reduced viscosity (measured with 0.5 g/dl of chloroform solution at 30° C.) in a range of preferably from 0.05 to 2.0 dl/g and more preferably from 0.10 to 0.8 dl/g in view of handleability.

The process for the production of the D component is not particularly limited. Examples of the process for the production of the D component may include the processes described in U.S. Pat. No. 3,306,874 in which, for example, 2,6-xylenol is subjected to oxidative polymerization using a complex of a cuprous salt and an amine as a catalyst, and processes described in U.S. Pat. Nos. 3,306,875, 3,257,357 and 3257358, Japanese Patent Publication No. 52-17880, and Japanese Patent Laid-Open Nos. 50-51197 and 63-152628.

As the D component, preferred is a polyphenylene ether resin in which an acidic functional group or a reactive functional group is introduced into the molecular chain terminal and/or a position other than the chain terminal. If such a functional group is introduced, the miscibility of the A component and the D component is improved, thereby enabling to increase the dispersibility of the D component in the A component. In addition, especially when an acidic functional group is introduced, it is preferable in the polymer electrolyte composition of the present invention, because the number of functional groups playing a role in the proton conductivity is increased and high proton conductivity may be expressed.

Examples of the acidic functional group introduced may include a sulfonic acid group, a phosphoric acid group, a sulfonimide group, a carboxylic acid group, a maleic acid group, a maleic anhydride group, a fumaric acid group, an itaconic acid group, an acrylic acid group and a methacrylic acid group, and preferred are a sulfonic acid group and a phosphoric acid group, which are a strong acid group, and more preferred is a sulfonic acid group. In addition, examples of the reactive functional group introduced may include an epoxy group, an oxazonyl group, an amino group, an isocyanate group, a carbodiimide group and the like, and preferred is an epoxy group. Further, two or more of these various functional groups may be introduced.

The method for introducing the acidic functional group or reactive functional group is not particularly limited. The acidic functional group or reactive functional group can be introduced by the general method. For example, the method for introducing the sulfonic acid group includes a method of using a sulfonating agent such as sulfuric anhydride and fuming sulfuric acid. For example, there may be employed the conditions described in C. Wang, Y. Huang, G. Cong, Polymer Journal, Vol. 27, No. 2, 173-178 (1995), and J. Schauer, W. Albrecht and T. Weigel, Journal of Applied Polymer Science, Vol. 73, 161-167 (1999).

In addition, preferably used is a polyphenylene ether resin in which the acidic functional group introduced is replaced with a metal salt or an amine salt. The metal salt preferably includes an alkali metal salt such as a sodium salt and a potassium salt, or an alkaline earth metal salt such as a calcium salt.

When using, as the polyphenylene ether resin (D component), an epoxy-modified polyphenylene ether resin in which the epoxy group is introduced into the molecular chain terminal, the dispersibility of the D component in the component A is increased, thereby enabling to improve the durability of the polymer electrolyte composition.

In the present embodiment, the process for the production of the epoxy-modified polyphenylene ether resin is not particularly limited. There may be employed a method of mixing a polyphenylene ether resin (D component) with an epoxy resin, described later, together with an polymer electrolyte (A component) and a compound (B component) having a thioether group and followed by reacting the polyphenylene ether resin (D component) with an epoxy resin.

(Epoxy Group-Containing Compound (E Component))

The epoxy group-containing compound (E component) used in the present embodiment is not particularly limited as long as it is a compound having an epoxy group, but includes, for example, a low-molecular compound containing an epoxy group, a homopolymer or copolymer of an unsaturated monomer having an epoxy group and an epoxy resin. Since a polymer compound is easier to handle at high temperatures, preferred are a homopolymer or copolymer of an unsaturated monomer having an epoxy group and an epoxy resin.

The low molecular compound having an epoxy group preferably is a solid or a liquid at 200° C., and specifically includes 1,2-epoxy-3-phenoxypropane, N-(2,3-epoxypropyl)phthalimide, 3,4-epoxytetrahydrothiophene-1,1-dioxide, glycidyl 4-nonylphenyl ether, glycidyl tosylate and glycidyl trityl ether.

The unsaturated monomer having an epoxy group, which constitutes the homopolymer or copolymer of an unsaturated monomer having an epoxy group, is not particularly limited, as long as it is an unsaturated monomer having an epoxy group, and includes, for example, glycidyl methacrylate, glycidyl acrylate, vinyl glycidyl ether, glycidyl ether of hydroxyalkyl(meth)acrylate, glycidyl ether of polyalkylene glycol (meth)acrylate and glycidyl itaconate. Among these, preferred is glycidyl methacrylate.

In the case of the copolymer of an unsaturated monomer having an epoxy group, as the other unsaturated monomer copolymerizing with the unsaturated monomer having an epoxy group, preferred are a vinyl aromatic compound such as styrene, a vinyl cyanide monomer such as acrylonitrile, vinyl acetate and a (meth)acrylic acid ester. Examples of the copolymer obtained by the copolymerization with these copolymerizable unsaturated monomers may include a styrene-glycidylmethacrylate copolymer, a styrene-glycidyl methacrylate-methylmethacrylate copolymer, and a styrene-glycidylmethacrylate-acrylonitrile copolymer.

Among these, preferred is a copolymer containing an unsaturated monomer having an epoxy group and a styrene monomer, because it is especially excellent in affinity with the D component and especially increases the dispersibility of the D component. From the viewpoint of increasing the dispersibility, the copolymer preferably contains a styrene monomer in an amount of at least 65% by mass or more. In addition, the copolymer contains an unsaturated monomer having an epoxy group in an amount of preferably from 0.3 to 20% by mass, more preferably from 1 to 15% by mass and still more preferably from 3 to 10% by mass.

Examples of the epoxy resin may include a cresol novolak-based epoxy resin, a bisphenol A-based epoxy resin, a bisphenol F-based epoxy resin, a bisphenol S-based epoxy resin, a hydantoin-based epoxy resin, a biphenyl-based epoxy resin, an alicyclic epoxy resin, a triphenylmethane-based epoxy resin and a phenol novolak-based epoxy resin. These resins may be used alone or may be used by mixing two or more kinds. Among these resins, from the viewpoint of the compatibility with a polyphenylene ether resin, preferred are a cresol novolak-based epoxy resin and a bisphenol A-based epoxy resin, and more preferred is a cresol novolak-based epoxy resin.

In the present embodiment, the polyphenylene ether resin (D component) and the epoxy resin as the E component may be added after previously mixing and reacting. That is, there may be used, as the polyphenylene ether resin (D component), the epoxy-modified polyphenylene ether resin obtained by reacting the polyphenylene ether resin with the epoxy resin. Needless to say, after mixing the polyphenylene ether resin (D component) and the epoxy resin together with the polymer electrolyte (A component) and the compound (B component) having the thioether group, the polyphenylene ether resin (D component) and the epoxy resin may be reacted.

When the epoxy-modified polyphenylene ether resin is used as the polyphenylene ether resin (D component), the dispersibility of the obtained polymer electrolyte composition is increased and thus the durability of the polymer electrolyte composition is further improved.

A mass ratio (D/E) between the D component and the E component is preferably from 0/100 to 100/0, more preferably from 20/80 to 80/20 and still more preferably from 30/70 to 70/30. If the mass ratio (D/E) is set in the above range, the component has a benefit of improving dispersibility.

A ratio of the total mass of the D component and the E component in the solid content in the polymer electrolyte composition is preferably from 0.01 to 20% by mass. From the viewpoint of the balance between ion conductivity and durability (dispersibility), the ratio is more preferably from 0.05 to 10% by mass and still more preferably from 0.1 to 5% by mass.

(Process for Producing Polymer Electrolyte Composition)

A polymer electrolyte composition of the present embodiment may be obtained by mixing the above-described components. The process for the production thereof is not particularly limited, but a general method of mixing the polymer electrolyte composition may be suitably applied.

(Process for Producing Polymer Electrolyte Membrane)

There will be described a process for producing a polymer electrolyte membrane formed from a polymer electrolyte composition of the present embodiment. The polymer electrolyte composition of the present embodiment is formed into a membrane, which may be used as a polymer electrolyte membrane. The membrane forming means is not particularly limited and a general membrane forming method of a polymer composition may be suitably applied.

For example, a polymer electrolyte membrane may be obtained by obtaining a polymer electrolyte composition as a solution or a suspension by dissolving or suspending the polymer electrolyte (A component), the compound (B component) having a thioether group and the compound (C component) having an azole ring in one or more protic solvents, applying (casting) the polymer electrolyte composition on a peelable substrate, forming a membrane by drying the solvent to solidify and then peeling the membrane from the peelable substrate.

In the present embodiment, when the A component is a perfluorocarbon sulfonic resin and the B component is a polyphenylene sulfide resin, from the viewpoint of improving particle dispersibility, a polymer electrolyte membrane is preferably produced by a production process including the following the steps (1) to (6):

(1) mixing the compound (B component) having a thioether group in the polymer electrolyte precursor and melt-extruding the mixture to obtain a molded product, (2) subjecting the molded product obtained in the step (1) to hydrolysis treatment and further subjecting to acid treatment to convert the polymer electrolyte precursor into the polymer electrolyte (A component), (3) dissolving or suspending the molded product acid-treated in the step (2) in one or more protic solvents to obtain a solution or suspension, (4) mixing the solution or suspension obtained in the step (3) with a solution or suspension of the compound (C component) having an azole ring to obtain a polymer electrolyte composition as a solution or suspension, (5) casting the polymer electrolyte composition obtained in the step (4), and (6) removing the solvent to form a membrane.

(Mixing and Melt Extrusion Step)

There is no particular limitation on the method of mixing the polymer electrolyte precursor and the compound (B component) having the thioether group and further the method of mixing the polyphenylene ether resin (D component) and/or the epoxy group-containing compound (E component). The general mixing method of the polymer composition may be applied. For example, the mixing may be carried out by the conventional known technique using Brabender, a kneader, a Banbury mixer, an extruder and the like.

After mixing, examples of the methods for carrying out melt extrusion may include a method using an extruder. The extruder used in this case is not particularly limited and the general extruder may be employed. Above all, if there is used a multi-screw extruder having twin-screw or more allowing for incorporation of kneading blocks into arbitrary positions of a screw, mixing and melt extrusion may be suitably carried out.

All kneading block portions of the screw used are incorporated substantially at (L/D)≧1.5, more preferably (L/D)≧5 (wherein L represents a total length of the kneading blocks and D represents a maximum outer diameter of the kneading blocks), and (π·D·N/h)≧50 is satisfied (wherein π=3.14, D: the outer diameter of a screw corresponding to the metering zone, N=the screw rotation number (revolutions/sec), and h=the depth of the groove of the metering zone). The extruders have a first raw material supply port on the upstream side with respect to the flow direction of the raw material and a second raw material supply port downstream the first raw material supply port, and if needed, one or more raw material supply ports may be further provided downstream the second raw material supply port. Furthermore, if needed, a vacuum vent port may be provided between these raw material supply ports.

The mixture prepared as above is extrusion molded through a nozzle, a die or the like. The molding method and the shape of the molded product are not particularly limited, but the molded product is preferably in the form of a pellet with a size of 0.5 cm³ or less in order to accelerate the rate in the hydrolysis treatment and acid treatment described later.

In addition, when the polymer electrolyte (A component) is used instead of the polymer electrolyte precursor, if the polymer electrolyte is subjected to hydrolysis treatment and acid treatment after kneading, the polymer electrolyte composition of the present embodiment may be obtained by omitting a process of converting into a form having an ion exchange group.

(Hydrolysis Treatment and Acid Treatment Steps)

The molded product obtained after the melt extrusion is subsequently immersed and hydrolyzed in a basic reaction solution. The polymer electrolyte precursor is converted into the polymer electrolyte (A component) by the hydrolysis treatment.

The reaction solution used for the hydrolysis treatment is not particularly limited, and preferred are an aqueous solution of an amine compound such as dimethylamine, diethylamine, monomethylamine or monoethylamine and an aqueous solution of an alkali metal such as sodium hydroxide and potassium hydroxide or a hydroxide of an alkaline earth metal. The content of the amine compound and the alkali metal or the hydroxide of alkaline earth metal is not particularly limited and is preferably from 10 to 30% by mass. The reaction solution preferably contains a swelling organic compound such as methyl alcohol, ethyl alcohol, acetone, DMSO (dimethylsulfoxide), DMAC (dimethylacetoamide) and DMF (dimethylformamide). The content ratio of the swelling organic compound is preferably from 1 to 30% by mass.

The treatment temperature varies depending on the kind and composition of the solvent and the like, and the treatment time can be shortened as the treatment temperature increases. If the treatment temperature is too high, the polymer electrolyte precursor is dissolved or highly swollen and becomes difficult to handle. Therefore, the treatment temperature is preferably from 20 to 160° C. All functional groups capable of being converted into $SO_3H$ by hydrolysis are preferably subjected to hydrolysis treatment in order to obtain high conductivity. Therefore, the longer the treatment time, the better. However, since productivity is decreased if the treatment time is too long, the treatment time is preferably from 0.5 to 48 hours.

The molded product is subjected to hydrolysis treatment in the basic reaction solution and sufficiently washed with hot water, and then subjected to acid treatment.

The acid used in the acid treatment is not particularly limited as long as it is mineral acids such as hydrochloric acid, sulfuric acid and nitric acid, and organic acids such as oxalic acid, acetic acid, formic acid and trifluoroacetic acid. By the acid treatment, the polymer electrolyte precursor is protonated.

(Dissolution or Suspension Step)

The molded product acid-treated as described above (molded product containing the protonated polymer electrolyte) is dissolved or suspended in a solvent (solvent having a good affinity with a resin) capable of dissolving or suspending the A component and the B component (which may contain the D component and/or the E component). Examples of the solvent may include a proptic organic solvent such as water, ethanol, methanol, n-propanol, isopropyl alcohol, butanol and glycerin and a non-protic solvent such as N,N-dimethylformamide, N,N-dimethylacetoamide and N-methylpyrrolidone. These may be used alone or in combination with two or more kinds thereof. Especially when one solvent is used, preferred is water. In addition, when two or more solvents are used, preferred is a mixed solvent of water and a protic organic solvent.

The molded product acid-treated may be a salt with an alkali metal atom, an alkaline earth metal atom or amines ($NH_4$, $NH_3R_1$, $NH_2R_1R_2$, $NHR_1R_2R_3$, or $NR_1R_2R_3R_4$), which is obtained by forming a salt by without performing acid treatment after hydrolysis treatment or by performing acid treatment.

The dissolution or suspension method is not specifically limited. For example, firstly, there are added the polymer electrolyte (A component) and the compound (B component) having the thioether group in a mixed solvent, for example, to a mixed solvent of water and a protic organic solvent under the condition such that the total solid content concentration is from 1 to 50% by mass. Subsequently, the composition is placed in an autoclave equipped with a glass inner cylinder as necessary and the air inside is replaced by an inert gas such as nitrogen, followed by heating and stirring for 1 to 12 hours under the condition such that the inner temperature is 50 to 250° C., thereby enabling to obtain a solution or suspension. In addition, the higher the total solid content concentration at this time, the better the yield, but the total solid content concentration is from 1 to 50% by mass. If the concentration is increased, undissolved materials are produced. Therefore, the concentration is preferably from 2 to 48% by mass, more preferably from 3 to 45% by mass, further more preferably from 4 to 40% by mass and still further more preferably from 5 to 30% by mass.

When a protic organic solvent is used, the mixing ratio of water to the protic organic solvent may be arbitrarily selected depending on the dissolution method, dissolution conditions, kind of polymer electrolyte, total solid content concentration, dissolution temperature, stirring rate and the like. The mass ratio of the protic organic solvent to water is preferably from 0.1 to 10 and more preferably from 0.1 to 5.

The solution or suspension includes a liquid in a state of an emulsion (in which liquid particles are dispersed as colloidal particles or particles which are more coarse than colloidal particles in a liquid to form an emulsified state), a suspension (in which solid particles are dispersed as colloidal particles or particles visible by a microscope in a liquid), a colloidal liquid (in which macromolecules are dispersed), a micellar liquid (a lyophilic colloid dispersion system obtained by the association of many small molecules by intermolecular force) and the like.

(Step of Mixing with Compound Having Azole Ring)

There is no limitation on the method of mixing the compound (C component) having the azole ring with a mixture of the A component and the B component the solution or suspension. When the C component is added in a solvent in advance to prepare a solution or suspension and then the solution or suspension is mixed, it is preferable from the viewpoint that the C component is dispersed more uniformly and finely.

Here, as the solvent to which the C component is added, there may be used one which is exemplified as a solvent capable of dissolving or suspending the A component. In addition, it is possible to use DMSO.

There is no limitation on the method of dissolving or suspending the compound (C component) having the azole ring. Examples of the method may include a method in which a polyazole-based compound and a non-protic solvent are heat-treated by placing in an autoclave, which is described in Patent Document 7 (International Publication No. 2005/000949). In addition to this, examples thereof may include a method of dissolving a polyazole-based compound and an alkali metal hydroxide in a protic solvent, which is described in Patent Document 8 (International Publication No. 2006/028190).

In addition, when a solution is mixed, it is preferable to sufficiently stir the solution in order to obtain a uniform solution. The stirring temperature is not particularly limited. If the stirring temperature is too high, a non-uniform precipitation of the polyazole-based compound occurs, and if the stirring temperature is too low, uniform stirring cannot be achieved. Therefore, the stirring temperature is preferably from −10 to 100° C. and more preferably from 10 to 50° C.

The polymer electrolyte composition of the present embodiment can be obtained by mixing the C component with a solution or suspension containing the A component and the B component.

(Ion Exchange Treatment Step)

It is possible to obtain a solution or suspension containing a protonated polymer electrolyte in which impurity ions such as an alkali metal are removed by subjecting the solution or suspension thus obtained to ion exchange dialysis with a cation exchange resin or a cation exchange membrane. If the solution or suspension is subjected to ion exchange treatment, the solution or suspension is excellent in stability with time and may exhibit high electrical properties without passing through the washing step at the later stage, as compared to one without subjecting to ion exchange treatment.

(Concentration Step)

The solution or suspension can be concentrated. The concentration method is not particularly limited. Examples thereof may include a method of heating to evaporate a solvent or a vacuum concentration method or the like. If the solid contents of the resulting coating solution are too high, the viscosity is increased and becomes difficult to handle, and if the solid contents are too low, the productivity is decreased. Therefore, the solid contents of the final coating solution are preferably from 0.5 to 50% by mass.

(Filtration Step)

The solution or suspension obtained as above is more preferably filtered from the viewpoint of removing coarse particle components.

The filtering method is not particularly limited and a general method which is conventionally carried out may be applied. Representative examples thereof may include a pressure filtering method using a conventionally used filter obtained by processing a filtering material with the rated filtration precision. For the filter, there is preferably used a filtering material in which the 90% collection particle diameter is 10 to 100 times the average particle diameter of the particles. The filtering material may be a filter paper or may be a filtering material like a sintered metal filter. Especially in the case of a filter paper, the 90% collection particle diameter is preferably 10 to 50 times the average particle diameter of the particles. In the case of a sintered metal filter, the 90% collection particle diameter is preferably 50 to 100 times the average particle diameter of the particles. If the 90% collection particle diameter is set at 10 times or more the average particle diameter, the pressure required when feeding a solution may be prevented from increasing too high and a filter may be prevented from being occluded in a short time. On the other hand, if the 90% collection particle diameter is set at 100 times or less the average particle diameter, it is preferable from the viewpoint of suitably removing particulate agglomerates and undissolved materials of a resin which may be foreign matter with a film.

It is preferable in controlling a membrane thickness that a solution or suspension after filtering is deaerated by a vacuum deaeration method or a centrifugation method or the like as a pre-treatment of casting described later. In addition, in order to facilitate the deaeration and homogenize the membrane thickness, it may be possible to add a solvent having a boiling point higher than that of water.

(Casting Step)

Examples of the methods of casting the solution or suspension may include the well-known coating methods by using the polymer electrolyte composition. More specifically, examples thereof may include a method of pouring the solution or suspension into a petri dish to produce and a method of using a well-known coating apparatus such as a blade coater, a gravure coater, a comma coater, a dip coater having a mechanism such as a blade, an air knife or a reverse roll, so as to make the thickness uniform. In addition, there may be employed a method of casting a coating solution through a die.

Examples of the substrate used in casting may include a substrate such as a general polymer film (for example, polyethylene terephthalate, polyaramide, polyimide and polyethylene naphthalate), a metallic foil, alumina and silicon, and a stretched porous polytetrafluoroethylene film which is described in Patent Document 3 (Japanese Patent Laid-Open No. 8-162132).

In addition, as the pre-treatment before casting, it is preferable from the viewpoint of controlling the thickness that the solution or suspension is deaerated by a vacuum deaeration method.

(Solvent Removal Step)

Examples of the method of removing a solvent after the casting may include a method of heat drying at room temperature to 200° C. and a method of applying reduced-pressure treatment. These methods may be combined together. In addition, in case of too high heat-drying temperature or rapid heating, bubbles and thickness unevenness occur during drying, and thus a normal polymer electrolyte membrane having uniform thickness accuracy may not be obtained in some cases. Further, if the heat-drying temperature is too low, the drying time is prolonged and the productivity may be decreased in some cases.

In addition, when heat drying is conducted, the solvent can be removed by stepwisely raising the temperature. There may be employed a method of forming a polymer electrolyte membrane having a uniform thickness at the first stage and heating the membrane at a higher temperature. When using this method, there can be obtained a polymer electrolyte membrane, which is free from dry spots and has good flatness, by decreasing the drying temperature at the first stage and extending the drying time.

(Heat Treatment Step)

The polymer electrolyte membrane thus obtained is successively subjected to heat treatment if necessary. The crystal portions and the polymer solid electrolyte portions are strongly bonded by heat treatment, and thus the mechanical strength may be stabilized. The heat treatment temperature is preferably from 120 to 300° C., more preferably from 140 to 250° C. and still more preferably from 160 to 230° C. If the heat treatment temperature is set at 120° C. or more, it may contribute to the improvement of the adhesion strength between the crystal portions and the electrolyte composition portions. On the other hand, if the heat treatment temperature is set at 300° C. or less, it is preferable from the viewpoint of maintaining the properties of the polymer electrolyte membrane. The heat treatment time, which depends on the heat treatment temperature, is preferably from 5 minutes to 5 hours and more preferably from 10 minutes to 2 hours.

(Washing Step)

The polymer electrolyte membrane is successively subjected to washing treatment using an acid and/or water, if necessary.

If washing with an acid is conducted, it is preferable from the viewpoint of removing metal ions which are ion-bonded to the ion exchange group in the polymer electrolyte membrane and organic ions, and improving the ion exchange capability. Therefore, if sufficient ion exchange capability is obtained without washing with an acid, washing with an acid is not required.

Herein, examples of the acid used for washing with an acid may include inorganic acids such as hydrochloric acid, sulfuric acid, nitric acid, phosphoric acid, hydrogen peroxide, phosphonic acid and phosphinic acid, and organic acids such as tartaric acid, oxalic acid, acetic acid, formic acid, trifluoroacetic acid, aspartic acid, aminobenzoic acid, aminoethylphosphonic acid, inosine, glycerinphosphoric acid, diaminobutyric acid, dichloroacetic acid, cysteine, dimethylcysteine, nitroaniline, nitroacetic acid, picric acid, picolinic acid, histidine, bipyridine, pyrazine, proline, maleic acid, methanesulfonic acid, trifluoromethanesulfonic acid, toluenesulfonic acid and trichloroacetic acid. These may be used alone or in combination with two or more kinds thereof. Further, these inorganic acids and organic acids may be used as a mixed solution with water, methyl ethyl ketone, acetonitrile, propylene carbonate, nitromethane, dimethyl sulfoxide, N,N-dimethylformamide, N-methyl-2-pyrrolidone, pyridine, methanol, ethanol, acetone and the like.

Among these acids, preferred are those having a pH at 25° C. of 2 or less. In addition, these acids may be used in the washing temperature range of from 0 to 160° C. If the washing temperature is too low, the reaction time is prolonged, and if the washing temperature is too high, it is not preferable because the acids become difficult to handle. In addition, an acid-resistant autoclave is preferably used for the acid washing at a higher temperature.

Further, washing with water is also conducted if necessary. Especially when washing with an acid is conducted, washing with water is conducted for the purpose of removing the residual acid in the membrane. However when washing with an acid is not conducted, washing with water may be conducted for the purpose of removing the impurities in the membrane.

As a solvent used for washing, there may be used, in addition to water, various organic solvents having a pH of from 1 to 7. When water is used for washing, there is preferably used a sufficient amount of purified water having conductivity of 0.06 S/cm or less and washing is preferably conducted until the pH of the washing water is 6 to 7.

(Stretching Step)

In the present embodiment, stretching orientation can be imparted by performing transverse uniaxial stretching, simultaneous biaxial stretching or sequential biaxial stretching together with the process described above. Such a stretching treatment is preferred because the mechanical properties of the polymer electrolyte membrane of the present embodiment as the proton exchange membrane can be improved.

The stretching treatment is preferably performed at a stretching ratio of from 1.1 to 6.0 times in the transverse direction (TD) and at a stretching ratio of from 1.0 to 6.0 times in the machine direction (MD), more preferably at a stretching ratio of from 1.1 to 3.0 times in the transverse direction and at a stretching ratio of from 1.0 to 3.0 times in the machine direction and further more preferably at a stretching ratio of from 1.1 to 2.0 times in the transverse direction and at a stretching ratio of from 1.0 to 2.0 times in the machine direction. The area stretching magnification is preferably from 1.1 to 36 times.

(Reinforcing Material)

In the present embodiment, reinforcement may be applied by the addition of a reinforcing material comprising an inorganic material, an organic material or an organic-inorganic hybrid material or by crosslinking, together with the process described above. The reinforcing material may be a fibrous substance, a particulate substance, a flaked substance. In addition, the reinforcing material may be a continuous support such as a porous film, a mesh and a non-woven fabric. In the present embodiment, the mechanical strength and the dry and wet dimensional stability may be easily improved by performing reinforcement by the addition of a reinforcing material. Especially when a fibrous substance or the continuous support is used for the reinforcing material, a high reinforcement effect is obtained. In addition, preferable is a material obtained by laminating a non-reinforced layer and the reinforced material in multilayer form by the arbitrary method.

The reinforcing material may be added and mixed simultaneously during melt-kneading, or may be impregnated in a solution or suspension, or may be laminated with a membrane after the membrane formation.

The inorganic material used as the reinforcing material is not particularly limited as long as it has a reinforcement effect, and examples thereof may include a glass fiber, a carbon fiber, a cellulose fiber, kaolin clay, kaolinite, halloysite, pyrophillite, talc, montmorillonite, sericite, mica, amesite, bentonite, asbestos, zeolite, calcium carbonate, calcium silicate, a diatomaceous earth, silica sand, ferrous ferrite, aluminum hydroxide, aluminum oxide, magnesium oxide, titanium oxide, zirconium oxide, graphite, fullerene, a carbon nanotube and carbon nanohorn.

The organic material used as the reinforcing material is also not particularly limited as long as it has a reinforcement effect, and examples thereof may include polyphenylene sulfide, polyphenylene ether, polysulfone, polyethersulfone, polyether ether sulfone, polyether ketone, polyether ether ketone, polythioethersulfone, polythioether ether sulfone, polythioether ketone, polythioether ether ketone, polybenzimidazole, polybenzoxazole, polyoxadiazole, polybenzoxadinone, polyxylylene, polyphenylene, polythiophene, polypyrrole, polyaniline, polyacene, polycyanogen, polynaphthylidine, polyphenylene sulfide sulfone, polyphenylenesulfone, polyimide, polyetherimide, polyesterimide, polyamidoimide, polyamide, aromatic polyamide, polystyrene, acrylonitrile-styrene resin, polystyrene-hydrogenated polybutadiene-polystyrene block copolymer, acrylonitrile-butadiene-styrene resin, polyester, polyarylate, liquid crystal polyester, polycarbonate, polytetrafluoroethylene, polyvinylidene fluoride, polyvinyl chloride, polyvinylidene chloride, methacrylic resin, epoxy resin, phenol resin, melamine resin, urethane resin, cellulose, polyketone, polyacetal, polypropylene and polyethylene.

An organic-inorganic hybrid material can also be used as the reinforcing material and examples thereof may include an organic silicon polymer compound having a silsesquioxane structure or a siloxane structure, such as POSS (Polyhedral Oligomeric Silsesquioxanes) and silicone rubber.

When using these reinforcing materials, in order to improve the affinity and interfacial adhesiveness with the A component, B component, C component, and further D component and E component, which are used in the present embodiment or the impregnating properties of the solution or suspension, it is possible to incorporate an ionic group such as a sulfonic acid group or an amine group on the surface of the reinforcing material and to treat the reinforcing material with a coupling agent. In addition, the reinforcing material for improving the interfacial adhesiveness may be a material, into a part or the entire of which an ion exchange group is uniformly introduced, for example, which has an ion-exchange capacity of from 0.5 meq/g or less.

When a porous material is used as the reinforcing material and is impregnated with the solution or suspension used in the present embodiment, it is preferable as the porosity rate is higher in increasing the ion conductivity of the membrane. However, since the reinforcing effect is reduced if the porosity rate is too low, the porosity rate is preferably from 40 to 99% and more preferably from 50 to 98%.

In addition, when a fibrous material is added and dispersed as the reinforcing material, the aspect ratio (length/fiber diameter) of the fiber is preferably 5 or more, because the higher the aspect ratio, the more effective for improving the mechanical strength, suppressing dimensional change in a planar direction during hydration and improving the lifetime during the cell operation.

(Membrane Thickness)

In the present embodiment, the thickness of the polymer electrolyte membrane is not limited, but is preferably from 1 to 500 µm, more preferably from 2 to 100 µm and still more preferably from 5 to 50 µm. If the membrane thickness is set at 1 µm or more, it is preferable in that disadvantages such as the direct reaction of hydrogen and oxygen may be reduced, and damage of the membrane and the like are unlikely to occur, even when the differential pressure, strain and the like occur during the handling at the time of production of the fuel cell or during the operation of the fuel cell. On the other hand, if the membrane thickness is set at 500 µm or less, it is preferable in maintaining the ion permeability and the performance as the solid polymer electrolyte membrane.

(EW)

In the present embodiment, the equivalent weight EW (the gram number of dry mass of the proton exchange membrane based on one equivalent of the proton exchange group) of the polymer electrolyte membrane is not limited, but is preferably from 333 to 2000, more preferably from 400 to 1500 and still more preferably from 500 to 1200. By using a proton conductive polymer having a lower EW, that is, a large proton exchange capacity, excellent proton conductivity is exhibited even under high-temperature low-humidification conditions, and when used for a fuel cell, high output can be obtained during the operation.

(Electrode Catalyst Layer)

The electrode catalyst layer of the present embodiment is characterized by being constituted from an electrode catalyst composition comprising a composite particle in which electrode catalyst particle is supported on an electrically conductive particle and a polymer electrolyte composition containing the polymer electrolyte (A component), the compound (B component) having the thioether group and the compound (C component) having the azole ring.

The electrode catalyst is a catalyst in which a fuel (for example, hydrogen) is oxidized to easily produce protons on the anode, and protons and electrons are reacted with an oxidant (for example, oxygen or air) to produce water on the cathode. The type of the electrode catalyst is not limited, but platinum is preferably used. In order to increase the resistance of platinum to impurities such as CO, there may be used an electrode catalyst in which ruthenium and the like are added to or alloyed with platinum in some cases.

The electrically conductive particles may be any kind of particles as long as they are electrically conductive, examples thereof may include carbon black such as furnace black, channel black and acetylene black, and activated carbon, graphite, various metals and the like. The electrically conductive particles have a particle diameter of preferably from 10 angstroms to 10 µm, more preferably from 50 angstroms to 1 µm and still more preferably from 100 to 5000 angstroms. The particle diameter of the electrode catalyst particles is not limited, but is preferably from 10 to 1000 angstroms, more preferably from 10 to 500 angstroms and still more preferably from 15 to 100 angstroms.

As the composite particles, it is preferable that the electrode catalyst particles are supported in an amount of preferably from 1 to 99% by mass, more preferably from 10 to 90% by mass and still more preferably from 30 to 70% by mass, based on the electrically conductive particles. Specifically, a preferred example may include a platinum-supported carbon catalyst such as TEC10E40E manufactured by Tanaka Kikinzoku Kogyo K.K.

In the present embodiment, the content ratio of the composite particles in the electrode catalyst layer is from 20 to 95% by mass, preferably from 40 to 90% by mass, more preferably from 50 to 85% by mass and still more preferably from 60 to 80% by mass.

In the present embodiment, the mass ratio (B/C) between the B component and the C component is from 1/99 to 99/1. From the viewpoint of the balance between chemical stability and durability (dispersibility), the ratio (B/C) is preferably from 5/95 to 95/5, more preferably from 10/90 to 10/99 and still more preferably from 20/80 to 80/20.

In the present embodiment, the ratio of the total mass of the B component and the C component to the solid contents in the polymer electrolyte composition is 0.01 to 50% by mass. From the viewpoint of the balance between ionic conductivity and durability (dispersibility), the ratio is preferably from 0.05 to 45% by mass, more preferably from 0.1 to 40% by mass, still more preferably from 0.2 to 35% by mass and still further more preferably from 0.3 to 30% by mass.

The supported amount of the electrode catalyst based on the electrode area with an electrode catalyst layer formed is preferably from 0.001 to 10 mg/cm$^2$, more preferably from 0.01 to 5 mg/cm$^2$ and most preferably from 0.1 to 1 mg/cm$^2$.

The electrode catalyst layer of the present embodiment preferably has a structure in which composite particles are binded with the perfluorocarbon sulfonic acid resin and the polyazole-based compound.

In the present embodiment, the electrode catalyst layer has a thickness of preferably from 0.01 to 200 µm, more preferably from 0.1 to 100 µm and still more preferably from 1 to 50 µm.

In the present embodiment, the void ratio of the electrode catalyst layer is not particularly limited, but the electrode catalyst layer has a void ratio of preferably from 10 to 90% by volume, more preferably from 20 to 80% by volume and still more preferably from 30 to 60% by volume.

The electrode catalyst layer of the present embodiment may further contain polytetrafluoroethylene (hereinafter, may be abbreviated as "PTFE") in some cases in order to improve water repellency. In this case, the shape of PTFE is not particularly limited as long as it has a finite shape and preferably is granular and fibrous. These shapes may be used alone, or may be used by combining them.

In the present embodiment, when the electrode catalyst layer contains PTFE, the content ratio of PTFE is preferably from 0.001 to 20% by mass, more preferably from 0.01 to 10% by mass and still more preferably from 0.1 to 5% by mass, based on the total mass of the electrode catalyst layer.

The electrode catalyst layer of the present embodiment may further contain a metal oxide in some cases in order to improve hydrophilicity. In this case, the metal oxide is not particularly limited, but preferred is a metal oxide having at least one constituent element selected from the group consisting of $Al_2O_3$, $B_2O_3$, $MgO$, $SiO_2$, $SnO_2$, $TiO_2$, $V_2O_5$, $WO_3$, $Y_2O_3$, $ZrO_2$, $Zr_2O_3$ and $ZrSiO_4$. Among these, preferred are $Al_2O_3$, $SiO_2$, $TiO_2$ and $ZrO_2$, and more preferred is $SiO_2$.

In the present embodiment, when the electrode catalyst layer contains a metal oxide, the content ratio of the metal oxide is preferably from 0.001 to 20% by mass, more preferably from 0.01 to 10% by mass and still more preferably from 0.1 to 5% by mass, based on the total mass of the electrode catalyst layer. The shape of the metal oxide may be granular or fibrous, but especially preferred is non-finite. The term "non-finite" as used herein refers to a state where no granular or fibrous metal oxide is observed even by observing with an optical microscope or an electron microscope. Especially, this term refers to a state where no granular or fibrous metal oxide is observed even by observing the electrode catalyst layer with a scanning electron microscope (SEM) at a magnification of hundreds of thousands. In addition, this term refers to a state where no granular or fibrous metal oxide can be observed even observing the electrode catalyst layer with a transmission electron microscope (TEM) at a magnification of hundreds of thousands to millions. Thus, this term refers to a state where no granular or fibrous metal oxide can be confirmed within the range of current microscope technology.

(Process for Producing Electrode Catalyst Layer)

The electrode catalyst layer of the embodiment may be produced, for example, by preparing a solution or suspension of a polymer electrolyte composition in which the polymer electrolyte (A component) having an ion exchange capacity of from 0.5 to 3.0 meq/g, the compound (B component) having a thioether group and the compound (C component) having an azole ring are dissolved or suspended in one or more protic solvents, the total mass percent of the A component, the B component and the C component in the polymer electrolyte composition is from 0.5 to 30% by mass (the D component and the E component may be incorporated) and the total mass percent of the B component and the C component in a solid content in the polymer electrolyte composition is from 0.01 to 50% by mass, preparing an electrode catalyst composition in which the composite particles are dispersed in the polymer electrolyte composition in an amount of 1 to 100% by mass based on the polymer electrolyte composition, coating the electrode catalyst composition on a polymer electrolyte membrane or the other substrate such as a PTFE sheet, and then drying and solidifying the electrode catalyst composition.

In the preparation of the electrode catalyst composition, the amount of the composite particles dispersed in the polymer electrolyte composition is preferably from 5 to 95% by mass and more preferably from 10 to 90% by mass, based on the polymer electrolyte composition.

In the present embodiment, Examples of the methods of coating the electrode catalyst composition may include generally known various methods such as a screen printing method and a spraying method.

The electrode catalyst composition may be used after a solvent is further added as necessary. Examples of the solvent which can be used may include a single solvent such as water, alcohols (for example, ethanol, 2-propanol, ethylene glycol and glycerin) and a chlorofluorocarbon or a mixed solvent thereof. The added amount of such a solvent is preferably from 0.1 to 90% by mass, more preferably from 1 to 50% by mass and still more preferably from 5 to 20% by mass, based on the total mass of the electrode catalyst composition.

In addition, on the other hand, the electrode catalyst layer of the present embodiment can also be obtained by coating, or impregnating and coating the polymer electrolyte composition on a gas diffusion electrode such as ELAT (registered trademark), manufactured by BASF, in which a gas diffusion layer and an electrode catalyst layer are laminated, followed by drying and solidifying.

Furthermore, the electrode catalyst layer is produced and then is impregnated in an inorganic acid such as hydrochloric acid in some cases. The acid treatment temperature is preferably from 5 to 90° C., more preferably from 10 to 70° C. and still more preferably from 20 to 50° C.

(Polymer Electrolyte Solution and Polymer Electrolyte Suspension)

The polymer electrolyte solution or the polymer electrolyte suspension of the present embodiment is a solution or suspension in which the polymer electrolyte (A component), the compound (B component) having the thioether group and the compound (C component) having the azole ring are dissolved or suspended in one or more protic solvents.

In the present embodiment, the total mass of the A component, B component and C component in the polymer electrolyte solution or the polymer electrolyte suspension is from 0.5 to 30% by mass, preferably from 1 to 30% by mass, more preferably from 2 to 29% by mass and still more preferably from 3 to 28% by mass.

In the present embodiment, the total mass of the B component and the C component in the solid content (electrolyte polymer) in the polymer electrolyte solution or the polymer electrolyte suspension is from 0.01 to 50% by mass, preferably from 1 to 50% by mass, more preferably from 3 to 40% by mass and still more preferably from 5 to 30% by mass.

In the present embodiment, the ratio of the A component in the solid content in the polymer electrolyte composition is preferably from 50 to 99.99% by mass. From the viewpoint of the balance between ion conductivity and durability (dispersibility), the ratio is more preferably from 55 to 99.95% by mass, still more preferably from 60 to 99.90% by mass, still further more preferably from 65 to 99.80% by mass and especially preferably from 60 to 99.7% by mass.

In the present embodiment, the ratio of the solvent in the polymer electrolyte solution or the polymer electrolyte suspension in which the A component, B component and C component, and further the D component and/or the E component are dissolved or suspended in one or more protic solvents is preferably 50 to 99% by mass. From the viewpoint of solubility and dispersibility, the ratio is more preferably from 52 to 98% by mass, still more preferably from 55 to 97% by mass, still further more preferably from 60 to 96% by mass and especially preferably from 70 to 95% by mass.

In the present embodiment, from the viewpoint of suitably achieving an effect such as an enhanced lifetime by improving the dispersibility, the X component has an average particle diameter of preferably from 0.01 to 2.0 µm, more preferably from 0.01 to 1.0 µm, still more preferably from 0.01 to 0.5 µm and still further more preferably from 0.01 to 0.1 µm.

(Membrane Electrode Assembly)

The polymer electrolyte membrane and the electrode catalyst layer of the present embodiment can be used as a constructional member of the membrane electrode assembly and solid polymer electrolyte-based fuel cell. A unit, in which two electrode catalyst layers of anode and cathode are joined on both surfaces of the polymer electrolyte membrane, is called a membrane electrode assembly (hereinafter, may be abbreviated as "MEA"). A unit, in which a pair of gas diffusion layers is joined so as to oppose each other on the further outer side of the electrode catalyst layer, may be called MEA in some cases. The electrode catalyst layer of the present embodiment is used as an anode catalyst layer and/or a cathode catalyst layer.

(Solid Polymer Electrolyte-Based Fuel Cell)

Basically, an operable solid polymer-based fuel cell can be obtained by connecting the anode and cathode of the MEA to each other through an electron conductive material which is disposed on the outside of the polymer electrolyte laminated membrane. In this case, the gas diffusion layers are set on each outer surface of the anode catalyst layer and the cathode catalyst layer as necessary. As the gas diffusion layer, a commercially available carbon cloth or carbon paper may be used. Representative examples of the former may include carbon cloth E-tek, B-1 manufactured by BASF, and representative examples of the latter may include CARBEL (registered trademark, manufactured by Japan Gore-Tex Inc.,), TGP-H manufactured by Toray Industries, Inc., Japan and carbon paper 2050 manufactured by Spectracorp, U.S.A. The methods for fabricating a solid polymer-based fuel cell are well known to a person skilled in the art. For example, the methods are described in detail in "Fuel Cell Handbook" (Van Nostrand Reinhold, A. J. Appleby et al, ISBN: 0-442-31926-6) and "Kagaku One Point, Nenryo Denchi" (2nd edition), edited by Masao Taniguchi and Manabu Seno, published by Kyoritsu Shuppan Co., Ltd., Japan, (1992).

Examples of the electron conductive material may include a current collector of a plate and the like, made of a composite material comprising graphite and a resin or a metal on which surface a groove for passing a gas such as fuel or oxidant is formed. When the MEA has no gas diffusion layer, a solid polymer-based fuel cell may be obtained by incorporating the MEA into a casing for a single cell (for example, a PEFC single cell, manufactured by ElectroChem. Inc., U.S.A.) in a state where the gas diffusion layer is disposed on each outer surface of the anode and cathode of the MEA.

In order to obtain high voltage, a plurality of the single cells are stacked to produce a stack cell, which operates a fuel cell. In order to produce a fuel cell as such a stack cell, a plurality of MEAs are fabricated and incorporated into a casing for a stack cell (for example, a PEFC stack cell, manufactured by ElectroChem. Inc., U.S.A.). In the fuel cell as such a stack cell, there is used a current collector called a "bipolar plate", which functions both as a separator for separating the fuel from the oxidant in the adjacent cells and as an electric connector between the adjacent cells.

A fuel cell is operated by supplying hydrogen to one electrode of the cell and supplying oxygen or air to the other electrode of the cell. In view of increasing the catalytic activity of the electrodes, the fuel cell is preferably operated at a temperature as high as possible. In general, the fuel cell is frequently operated at 50 to 80° C., where the control of moisture is easy. However, the fuel cell may also be operated at 80 to 150° C.

EXAMPLES

Hereinafter, the present embodiment will be more specifically described with reference to examples, but the present embodiment is not limited to these examples.

In addition, the evaluation methods and measurement methods used in the present embodiment are as follows.

(Membrane Thickness)

A polymer electrolyte membrane was allowed to stand in a constant temperature chamber at 23° C. under 50% RH for one hour or more, and then the thickness of the membrane was measured using a membrane thickness meter (B-1, manufactured by Toyo Seiki Seisaku-sho, Ltd.).

(Ion Exchange Capacity)

A polymer electrolyte membrane having a size of approximately 2 to 20 $cm^2$, in which the counter ion of the ion exchange group was in a proton form, was immersed in 30 ml of a saturated NaCl aqueous solution at 25° C. and allowed to stand for 30 minutes while stirring. Thereafter, the amount of protons in the saturated NaCl aqueous solution was measured by neutralization titration with a 0.01 N aqueous sodium hydroxide aqueous solution using phenolphthalein as an indicator. After neutralization, the resulting polymer electrolyte membrane, in which the counter ion of the ion exchange group was in a sodium ion form, was rinsed with purified water, vacuum dried and weighed. The equivalent weight EW (g/eq) was determined by the following expression, in which M (mmol) represents a mass of sodium hydroxide required for neutralization and W (mg) represents a mass of the polymer electrolyte membrane in which the counter ion of the ion exchange group was a sodium ion.

$$EW=(W/M)-22$$

In addition, the ion exchange capacity (meq/g) was calculated by multiplying the EW value obtained by 1000.

(Cumulative Volume)

For a sample obtained by diluting and dispersing a solution, which was obtained by dissolving and/or suspending a polymer electrolyte membrane, with water, the cumulative volume (volume basis) of the X component having a particle diameter of 10 µm or more was measured. As a measurement apparatus, there was used a laser diffraction/scattering-type particle size distribution measuring apparatus manufactured by Horiba, Ltd. All the measurement values were shown as the calculated results using a refractive index of 1.33. As the cumulative volume (volume basis), the volume ratio occupied by particles having a particle diameter of 10 µm or more in the particle size distribution was shown assuming that the total particle volume was 100.

(OCT Accelerated Test)

In order to perform accelerated evaluation of the durability of the cell properties of the polymer electrolyte membrane and the electrode catalyst layer under high-temperature low-humidification conditions, the following OCV accelerated test was performed. The term "OCV" used herein means an "open circuit voltage". The OCV accelerated test is an accelerated test, which intends to promote the chemical deterioration of a polymer electrolyte membrane by maintaining the membrane in an OCV state. (The details of the OCV accelerated test are described in pp. 55-57, the report on the results of the research by Asahi Kasei Corporation, Contract research from the New Energy and Industrial Technology Development Organization, Japan, 2002, "Research and development of solid polymer-based fuel cell (studies for establishing accelerated evaluation techniques for membranes))".

Firstly, a gas diffusion electrode on the anode side and a gas diffusion electrode on the cathode side were faced each other and a polymer electrolyte membrane was sandwiched between the gas diffusion electrodes via an electrode catalyst layer. The resulting assembly was incorporated into a cell for evaluation. When the polymer electrolyte membrane of the present embodiment was evaluated, as the gas diffusion electrode, there was used the gas diffusion electrode ELAT (registered trade mark) (manufactured by DE NORA NORTH AMERICA, U.S.A.) (the amount of Pt supported: 0.4 mg/cm$^2$, hereinafter the same). In addition, the electrode catalyst layer was obtained by applying a 5% by mass of perfluorosulfonic acid polymer solution (Aciplex-SS (registered trademark), produced by Asahi Kasei Chemicals Corporation, equivalent weight (EW): 910, solvent composition (mass ratio): ethanol/water=50/50) onto the gas diffusion electrode, followed by drying and fixation in an atmospheric air at 140° C. The amount of polymer supported was 0.8 mg/cm$^2$.

The cell for evaluation was set in an evaluation apparatus (a fuel cell evaluation system 890CL; manufactured by TOYO Corporation) and the temperature of the cell was increased. Thereafter, a hydrogen gas was flowed to the anode side and an air gas was flowed to the cathode side, each at a flow rate of 200 ml/min, thereby maintaining the membrane in an OCV state. The hydrogen gas and air gas were humidified by a water-bubbling system and then supplied to the cell.

The test was performed at a cell temperature of 100° C. The gases were humidified at 50° C. (corresponding to a humidity of 12% RH), and both the anode side and cathode side were not pressurized (atmospheric pressure).

(1) Measurement of Fluorine Release Rate

The waste waters discharged together with an anode exhaust gas and a cathode exhaust gas during the single cell characteristic test were trapped and collected for a predetermined time and then weighed. A fluorine composite electrode 9609BNionplus manufactured by Meditorial K.K. was installed to a bench-top pH ion meter 920Aplus manufactured by the same company, and the fluorine ion concentrations in the anode waste water and in the cathode waste water were measured to derive the fluorine release rate G from the following expression:

$$G=(Wa \times Fa + Wc \times Fc)/(T \times A)$$

G: Fluorine release rate (μg/Hr/cm$^2$)
Wa: Mass (g) of anode waste water trapped and collected
Fa: Fluorine ion concentration (ppm) in anode waste water
Wc: Mass (g) of cathode waste water trapped and collected
Fc: Fluorine ion concentration (ppm) in cathode waste water
T: Time period (Hr) for trapping and collecting wastewaters
A: Electrode Area (cm$^2$) of MEA (2) Measurement of Cross Leak Amount In order to investigate whether or not a pinhole occurred in the polymer electrolyte membrane, the hydrogen gas permeability of the membrane was measured every 10 hours from the start of the test using a flow-type gas permeability analyzer, GTR-100FA manufactured by GTR TEC Corporation. While maintaining the anode side of the evaluation cell at 0.15 MPa with a hydrogen gas, an argon gas as a carrier gas was flowed to the cathode side of the evaluation cell at a flow rate of 10 ml/min. The hydrogen gas permeated by cross leakage from the anode side to the cathode side of the evaluation cell was introduced into a gas chromatograph, G2800 together with the carrier gas, followed by quantifying the permeation amount of the hydrogen gas. The hydrogen gas permeability L (cc×cm/cm$^2$/sec/cmHg) was calculated by the following expression, wherein X (ml) represents the permeation amount of the hydrogen gas, B (=1.100) represents the correction coefficient, T(cm) represents the thickness of the polymer electrolyte membrane, P(cmHg) represents the hydrogen partial pressure, A (cm$^2$) represents the hydrogen permeation area of the polymer electrolyte membrane, and D (sec) represents the measurement time.

$$L=(X \times B \times T)/(P \times A \times D)$$

The cell lifetime was taken when the hydrogen gas permeability became $1 \times 10^7$ (ml×cm/cm$^2$/sec/cmHg) or more, and the test was terminated at that time.

Example 1

A stainless steel stirring type autoclave was charged with a 10% aqueous solution of $C_7F_{15}COOCH_4$ and purified water, and the autoclave was sufficiently evacuated and purged with nitrogen. Thereafter, the pressure inside the autoclave was increased to a gauge pressure of 0.7 MPa by introducing tetrafluoroethylene (CF2=CF2 gas). Subsequently, an ammonium persulfate aqueous solution was injected to initiate polymerization. In order to compensate for the amount of TFE consumed by polymerization, TFE gas was continuously fed so that the pressure inside the autoclave was maintained at 0.7 MPa, and the polymerization was performed by continuously feeding $CF_2=CFO(CF_2)_2—SO_2F$ in an amount corresponding to the mass ratio of 0.70 based on the TFE fed to obtain a perfluorosulfonic acid resin precursor (EW after hydrolysis and acid treatment: 730). By setting the mass ratio of the perfluorosulfonic acid resin precursor thus obtained to a polyphenylene sulfide (produced by Sigma-Aldrich Japan K.K., melt viscosity at 310° C.: 275 poise) at 95/5 and using a biaxial extruder (ZSK-40; manufactured by Werner & Pfleiderer Industrielle Backtechnik GmbH, Germany) set at a temperature of from 280 to 310° C. and a screw rotation number of 200 rpm, there were supplied the resin precursor and polyphenylene sulfide from the first raw material supply port of the extruder and melt-kneaded. Thereafter, the kneaded product was melt-extruded through a strand die to form a cylindrical pellet with a diameter of approximately 2 mm and a length of approximately 2 mm. The pellet was subjected to hydrolysis treatment by contacting with an aqueous solution obtained by dissolving potassium hydroxide (15% by mass) and methyl alcohol (50% by mass) at 80° C. for 20 hours, and then was immersed in water at 60° C. for 5 hours. Thereafter, the resulting pellet was immersed in a 2N aqueous solution of hydrochloric acid at 60° C. for one hour five times by renewing the aqueous solution of hydrochloric acid every time, washed with ion exchange water and dried to obtain a pellet having a sulfonic acid group ($SO_3H$).

The pellet was placed in a 5 L autoclave together with an ethanol aqueous solution (water/ethanol=50.0/50.0 (mass ratio)) and was tightly sealed. The temperature of the resulting mixture was increased to 160° C. while stirring with a blade and maintained for 5 hours. Thereafter, the autoclave was naturally cooled to prepare a uniform mixed solution (solution [FS-1]) of 5% by mass of a perfluorosulfonic acid resin and polyphenylene sulfide.

Subsequently, dimethylacetoamide (DMAC) was added to a 5% by mass of perfluorosulfonic acid polymer solution (Aciplex-SS (registered trademark), produced by Asahi Kasei Chemicals Corporation, EW=720, solvent composition (mass ratio): ethanol/water=50/50, hereinafter may be abbreviated as a "solution [A-1]"), and the mixture was refluxed at 120° C. for one hour, followed by vacuum concentration to prepare a solution (solution [A-2]) in which the mass ratio of the perfluorosulfonic acid resin to DMAC was 1.5/98.5.

Further, to an autoclave was added poly[2,2'-(m-phenylene)-5,5'-bibenzimidazole] (produced by Sigma-Aldrich Japan K.K., weight average molecular weight: 27000) together with DMAC and was tightly closed. The temperature of the resulting mixture was increased to 200° C. and maintained for 5 hours. Thereafter, the autoclave was naturally cooled to prepare a PBI solution in which the mass ratio of PBI to DMAC was 10/90. Further, the PBI solution was diluted with DMAC to ten times to prepare 1% by mass of a uniform PBI solution (solution [C-1]).

After adding and mixing 6.5 g of the solution [C-1] to 40.0 g of the solution [A-2], to the resulting mixture were added 78.2 g of the solution [FS-1] and 38.9 g of the solution [A-1] in order while stirring to adjust so that the mass ratio (A/B/C) of the perfluorocarbon sulfonic acid resin (A component)/the polyphenylene sulfide resin (B component)/the azole-based compound (C component) was 96/3/1. The mixed solution was further subjected to vacuum concentration at 80° C., followed by distilling off part of ethanol and water to obtain a cast solution.

The cast solution was poured into a petri dish having a diameter of 15.4 cm and dried at 60° C. for one hour and at 80° C. for one hour on a hot plate to remove the solvent. Thereafter, the petri dish was placed in an oven and heat treatment was carried out at 160° C. for 1 hour. Subsequently, the petri dish was taken out of the oven and ion exchange water was poured into the cooled petri dish to peel off a membrane, thereby obtaining a polymer electrolyte membrane having a membrane thickness of approximately 50 μm. Next, the polymer electrolyte membrane was immersed in a 2N aqueous solution of hydrochloric acid at 60° C. for 3 hours, followed by washing with ion exchange water and drying to obtain a polymer electrolyte membrane (EW: 790, ion exchange capacity: 1.27).

The X component cumulative volume (volume basis) of the membrane having a particle diameter of 10 μm or more was 2%.

The OCV accelerated test of the polymer electrolyte membrane was carried out to show that the average value of the fluorine release rate in the waste water from the start until 50 hours was 0.10 (μg/Hr/cm$^2$), which was a low value. The cell had a lifetime of more than 1000 hours, showing extremely excellent durability. The results including the cross leak amount are shown in Table 1.

Example 2

There was prepared a uniform mixed solution (solution [FS-2]) of a perfluorosulfonic acid resin and polyphenylene sulfide having a solid content concentration of 5% by mass in the same manner as in Example 1 except for changing the mass ratio of the perfluorosulfonic acid resin precursor (EW after hydrolysis and acid treatment: 730) obtained from tetrafluoroethylene and $CF_2=CFO(CF_2)_2—SO_2F$ to a polyphenylene sulfide (produced by Sigma-Aldrich Japan K.K., melt viscosity at 310° C.: 275 poise) to 90/10.

Subsequently, as with Example 1, after adding and mixing 16.3 g of the solution [C-1] to 100.0 g of the solution [A-2], to the resulting mixture were added 65.2 g of the solution [FS-2] and 31.9 g of the solution [A-1] in order while stirring to adjust so that the mass ratio (A/B/C) of the perfluorocarbon sulfonic acid resin (A component)/the polyphenylene sulfide resin (B component)/the polyazole-based compound (C component) was 92.5/5/2.5. The mixed solution was further subjected to vacuum concentration at 80° C., followed by distilling off part of ethanol and water to obtain a cast solution.

The cast solution was subjected to pressure filtration by placing a membrane filter AN1H04700 (with a pore diameter of 10.0 μm) produced by Millipore Corporation in a stainless steel line holder KS-47 manufactured by Advantec Mfs, Inc.

The resulting solution was casted in the same manner as in Example 1 to obtain a polymer electrolyte membrane having a membrane thickness of approximately 50 μm. Subsequently, the polymer electrolyte membrane was immersed in a 2N aqueous solution of hydrochloric acid at 60° C. for 3 hours, followed by washing with ion exchange water and drying to obtain a polymer electrolyte membrane (EW: 890, ion exchange capacity: 1.12).

The X component cumulative volume (volume basis) of the membrane having a particle diameter of 10 μm or more was 1%.

The OCV accelerated test of the polymer electrolyte membrane was carried out to show that the average value of the fluorine release rate in the waste water from the start until 50 hours was 0.05 (μg/Hr/cm$^2$), which was a very low value. The cell had a lifetime of more than 1000 hours, showing extremely excellent durability. The results including the cross leak amount are shown in Table 1.

Example 3

There was prepared a uniform mixed solution (solution [FS-3]) of a perfluorosulfonic acid resin and polyphenylene sulfide having a solid content concentration of 5% by mass in the same manner as in Example 1 except for setting the mass ratio of the perfluorosulfonic acid resin precursor (EW after hydrolysis and acid treatment: 730) obtained from tetrafluoroethylene and $CF_2=CFO(CF_2)_2—SO_2F$/a polyphenylene sulfide (produced by Sigma-Aldrich Japan K.K., melt viscosity at 310° C.: 275 poise)/a polyphenylene ether (obtained by the oxidation polymerization of 2,6-xylenol, reduced viscosity: 0.51, glass transition temperature (Tg): 209° C.)/an epoxy group-containing compound (the cresol novolac-based epoxy resin N-660, produced by DIC Corporation) at 90/7/1/2.

Subsequently, as with Example 1, after adding and mixing 16.3 g of the solution [C-1] to 100.0 g of the solution [A-2], to the resulting mixture were added 93.1 g of the solution [FS-3] and 3.9 g of the solution [A-1] in order while stirring to adjust so that the mass ratio (A/B/C/D/E) of the perfluorocarbon sulfonic acid resin (A component)/the polyphenylene sulfide resin (B component)/the polyazole-based compound (C component)/the polyphenylene ether resin (D component)/the epoxy group-containing compound (E component) was 90.4/5/2.5/0.7/1.4. The mixed solution was further subjected to vacuum concentration at 80° C., followed by distilling off part of ethanol and water to obtain a cast solution.

The cast solution was subjected to pressure filtration in the same manner as Example 2, followed by casting to obtain a polymer electrolyte membrane having a membrane thickness of approximately 50 μm. Thereafter, the polymer electrolyte membrane was immersed in a 2N aqueous solution of hydrochloric acid at 60° C. for 3 hours, followed by washing with ion exchange water and drying to obtain a polymer electrolyte membrane (EW: 930, ion exchange capacity: 1.08).

The X component cumulative volume (volume basis) of the membrane having a particle diameter of 10 μm or more was 1%.

The OCV accelerated test of the polymer electrolyte membrane was carried out to show that the average value of the fluorine release rate in the waste water from the start until 50 hours was 0.04 ($\mu$g/Hr/cm$^2$), which was a very low value. The cell had a lifetime of more than 1000 hours, showing extremely excellent durability. The results including the cross leak amount are shown in Table 1.

Comparative Example 1

There was prepared a uniform solution having a solid content concentration of 5% by mass in the same manner as in Example 1 except for singly using the perfluorosulfonic acid resin precursor (EW after hydrolysis and acid treatment: 730) obtained from tetrafluoroethylene and $CF_2=CFO(CF_2)_2-SO_2F$.

There was obtained a polymer electrolyte membrane having a membrane thickness of approximately 50 $\mu$m by casting 35.4 g of the solution in the same manner as in Example 1. Thereafter, the polymer electrolyte membrane was immersed in a 2N aqueous solution of hydrochloric acid at 60° C. for 3 hours, followed by washing with ion exchange water and drying to obtain a polymer electrolyte membrane (EW: 730, ion exchange capacity: 1.37).

The OCV accelerated test of the polymer electrolyte membrane was carried out to show that the average value of the fluorine release rate in the waste water from the start until the lifetime of the cell was 9.07 ($\mu$g/Hr/cm$^2$), which was a very high value. The cell lifetime was 45 hours, and sufficient durability was not obtained. The results including the cross leak amount are shown in Table 1.

Comparative Example 2

Based on the method disclosed in Example 10 in Patent Document 8, there was produced a polymer electrolyte membrane having a membrane thickness of approximately 50 $\mu$m in which the mass ratio of a perfluorosulfonic acid resin/a polyphenylene sulfide/a polyphenylene ether/an epoxy group-containing compound was 70/7/1/2 in the following manner.

By setting the mass ratio of a perfluorosulfonic acid resin precursor (EW after hydrolysis and acid treatment: 730) obtained from tetrafluoroethylene and $CF_2=CFO(CF_2)_2-SO_2F$ in the same manner as in Example 1/a polyphenyle sulfide (produced by Sigma-Aldrich Japan K.K., melt viscosity at 310° C.: 275 poise)/a polyphenylene ether (obtained by the oxidation polymerization of 2,6-xylenol, reduced viscosity: 0.51, glass transition temperature (Tg): 209° C.)/an epoxy group-containing compound (the cresol novolac-based epoxy resin N-660, produced by DIC Corporation) at 90/7/1/2 and using a biaxial extruder (ZSK-40, manufactured by Werner & Pfleiderer Industrielle Backtechnik GmbH, Germany) set at a temperature of from 280 to 310° C. and a screw rotation number of 200 rpm, there were supplied the resin precursor, polyphenylene sulfide, polyphenylene ether and epoxy group-containing compound from the first raw material supply port of the extruder and melt-kneaded. Thereafter, the kneaded product was melt-extruded using a T-die extruder to form a film having a thickness of 50 $\mu$m. The film was contacted in an aqueous solution obtained by dissolving potassium hydroxide (15% by mass) and dimethyl sulfoxide (30% by mass) at 60° C. for 4 hours and then subjected to alkali hydrolysis. Thereafter, the resulting film was immersed in water at 60° C. for 4 hours. Subsequently, the resulting film was immersed in a 2N aqueous solution of hydrochloric acid at 60° C. for 3 hours, followed by washing with ion exchange water and drying to obtain a polymer electrolyte membrane (EW: 810, ion exchange capacity: 1.23). The X component cumulative volume (volume basis) of the membrane having a particle diameter of 10 $\mu$m or more was 7%.

The OCV accelerated test of the polymer electrolyte membrane was carried out to show that the average value of the fluorine release rate in the waste water from the start until 50 hours was 0.90 ($\mu$g/Hr/cm$^2$), which was a low value. However, the cell lifetime was 194 hours, and sufficient durability was not obtained. The results including the cross leak amount are shown in Table 1.

Comparative Example 3

There was prepared a uniform solution having a solid content concentration of 5% by mass in the same manner as in Example 1 except for changing the mass ratio of the perfluorosulfonic acid resin precursor (EW after hydrolysis and acid treatment: 730) obtained from tetrafluoroethylene and $CF_2=CFO(CF_2)_2-SO_2F$ to a polyphenylene sulfide (produced by Sigma-Aldrich Japan K.K., melt viscosity at 310° C.: 275 poise) to 90/10.

After adding and stirring 25.0 g of dimethylacetoamide and 100.0 g of the solution [A-1] to 100.0 g of the solution, the mass ratio (A/B) of the perfluorocarbon sulfonic acid resin (A component) to the polyphenylene sulfide resin (B component) was adjusted so as to be 95/5. The mixed solution was further subjected to vacuum concentration at 80° C., followed by distilling off part of ethanol and water to obtain a cast solution.

The cast solution was subjected to pressure filtration by placing a membrane filter AN1H04700 (with a pore diameter of 10.0 $\mu$m) produced by Millipore Corporation in a stainless steel line holder KS-47 manufactured by Advantec Mfs, Inc.

The resulting solution was casted in the same manner as in Example 1 to obtain a polymer electrolyte membrane having a membrane thickness of approximately 50 $\mu$m. Subsequently, the polymer electrolyte membrane was immersed in a 2N aqueous solution of hydrochloric acid at 60° C. for 3 hours, followed by washing with ion exchange water and drying to obtain a polymer electrolyte membrane (EW: 745, ion exchange capacity: 1.34). The X component cumulative volume (volume basis) of the membrane having a particle diameter of 10 $\mu$m or more was 1%.

The OCV accelerated test of the polymer electrolyte membrane was carried out to show that the average value of the fluorine release rate in the waste water from the start until 50 hours was 0.10 ($\mu$g/Hr/cm$^2$), which was a low value. However, the cell lifetime was 331 hours, and sufficient durability was not obtained. The results including the cross leak amount are shown in Table 1.

Comparative Example 4

Based on the method disclosed in Example 1 in Patent Document 7, there was produced a polymer electrolyte membrane having a membrane thickness of approximately 50 $\mu$m in which the mass ratio of a perfluorosulfonic acid resin to a polyazole-based compound was 97.5/2.5 in the following manner.

After adding and mixing 16.3 g of the solution [C-1] to 100.0 g of the solution [A-2] prepared in the same manner as in Example 1, to the resulting solution was added 97.1 g of the solution [A-1] followed by stirring so that the mass ratio (A/C) of the perfluorocarbon sulfonic acid resin (A component) to the polyazole-based compound (C component) was adjusted to be 97.5/2.5. The mixed solution was further subjected to vacuum concentration at 80° C., followed by distilling off part of ethanol and water to obtain a cast solution.

The resulting solution was casted in the same manner as in Example 1 to obtain a polymer electrolyte membrane having a membrane thickness of approximately 50 μm. Subsequently, the polymer electrolyte membrane was immersed in a 2N aqueous solution of hydrochloric acid at 60° C. for 3 hours, followed by washing with ion exchange water and drying to obtain a polymer electrolyte membrane (EW: 870, ion exchange capacity: 1.15).

The OCV accelerated test of the polymer electrolyte membrane was carried out to show that the average value of the fluorine release rate in the waste water from the start until 50 hours was 0.50 (μg/Hr/cm$^2$), which was a low value. However, the cell lifetime was 325 hours, and sufficient durability was not obtained. The results including the cross leak amount are shown in Table 1.

fluorine release rate in the waste water from the start until 50 hours was 0.03 (μg/Hr/cm$^2$), which was a very low value. The cell had a lifetime of more than 1000 hours, showing extremely excellent durability. The results including the cross leak amount are shown in Table 2.

Example 5

After adding and mixing 16.3 g of the solution [C-1] to 100.0 g of the solution [A-2] prepared in the same manner as in Example 1, to the resulting solution were added 65.2 g of the solution [FS-1] prepared in the same manner as in Example 1 and 31.9 g of the solution [A-1] in order while stirring to adjust so that the mass ratio (A/B/C) of the perfluorocarbon sulfonic acid resin (A component)/the polyphe-

TABLE 1

| | Polymer Electrolyte Membrane Composition (%) | | | | | | Ion exchange | X Component | OCV | | Cross Leak Amount L (ml × cm/cm$^2$/sec/cmHg) | |
|---|---|---|---|---|---|---|---|---|---|---|---|---|
| | | | | | | | EW | Capacity | Cumulative | Operation | Fluorine Release Rate G | Before | |
| | A | B | C | D | E | Filtration | (g/eq) | (meq/g) | Volume (%) | Time (Hr) | (μg/Hr/cm$^2$) 50 hr | Operation | 50 hr |
| Example 1 | 96 | 3 | 1 | 0 | 0 | No | 790 | 1.27 | 2 | >1000 | 0.10 | 0.6 × 10$^{-8}$ | 1.2 × 10$^{-8}$ |
| Example 2 | 92.5 | 5 | 2.5 | 0 | 0 | Yes | 890 | 1.12 | 1 | >1000 | 0.05 | 0.7 × 10$^{-8}$ | 1.0 × 10$^{-8}$ |
| Example 3 | 90.4 | 5 | 2.5 | 0.7 | 1.4 | Yes | 930 | 1.08 | 1 | >1000 | 0.04 | 0.6 × 10$^{-8}$ | 0.8 × 10$^{-8}$ |
| Comparative Example 1 | 100 | 0 | 0 | 0 | 0 | No | 730 | 1.37 | — | 45 | 9.07 (45 Hr) | 1.1 × 10$^{-8}$ | 3.3 × 10$^{-7}$ (45 Hr) |
| Comparative Example 2 | 90 | 7 | 0 | 1 | 2 | No | 810 | 1.23 | 7 | 194 | 0.90 | 0.5 × 10$^{-8}$ | 1.5 × 10$^{-8}$ |
| Comparative Example 3 | 95 | 5 | 0 | 0 | 0 | Yes | 745 | 1.34 | 1 | 331 | 0.10 | 0.6 × 10$^{-8}$ | 1.3 × 10$^{-8}$ |
| Comparative Example 4 | 97.5 | 0 | 2.5 | 0 | 0 | No | 870 | 1.15 | — | 325 | 0.50 | 0.5 × 10$^{-8}$ | 1.8 × 10$^{-8}$ |

Example 4

After adding and mixing 16.3 g of the solution [C-1] to 100.0 g of the solution [A-2] prepared in the same manner as in Example 1, to the resulting solution were added 65.2 g of the solution [FS-1] prepared in the same manner as in Example 1 and 31.9 g of the solution [A-1] in order while stirring to adjust so that the mass ratio (A/B/C) of the perfluorocarbon sulfonic acid resin (A component)/the polyphenylene sulfide resin (B component)/the polyazole-based compound (C component) was 94.5/3/2.5. The mixed solution was further subjected to vacuum concentration at 80° C., followed by distilling off part of ethanol and water to obtain a cast solution.

The cast solution was subjected to pressure filtration by placing a membrane filter AN1H04700 (with a pore diameter of 10.0 μm) produced by Millipore Corporation in a stainless steel line holder KS-47 manufactured by Advantec Mfs, Inc.

The resulting solution was casted in the same manner as in Example 1 to obtain a polymer electrolyte membrane having a membrane thickness of approximately 50 μm. Subsequently, the polymer electrolyte membrane was immersed in a 2N aqueous solution of hydrochloric acid at 60° C. for 3 hours, followed by washing with ion exchange water and drying to obtain a polymer electrolyte membrane (EW: 880, ion exchange capacity: 1.14).

The X component cumulative volume (volume basis) of the membrane having a particle diameter of 10 μm or more was 1%.

The OCV accelerated test of the polymer electrolyte membrane was carried out to show that the average value of the nylene sulfide resin (B component)/the polyazole-based compound (C component) was 96.5/1/2.5. The mixed solution was further subjected to vacuum concentration at 80° C., followed by distilling off part of ethanol and water to obtain a cast solution.

The cast solution was subjected to pressure filtration by placing a membrane filter AN1H04700 (with a pore diameter of 10.0 μm) produced by Millipore Corporation in a stainless steel line holder KS-47 manufactured by Advantec Mfs, Inc.

The resulting solution was casted in the same manner as in Example 1 to obtain a polymer electrolyte membrane having a membrane thickness of approximately 50 μm. Subsequently, the polymer electrolyte membrane was immersed in a 2N aqueous solution of hydrochloric acid at 60° C. for 3 hours, followed by washing with ion exchange water and drying to obtain a polymer electrolyte membrane (EW: 860, ion exchange capacity: 1.16).

The X component cumulative volume (volume basis) of the membrane having a particle diameter of 10 μm or more was 1%.

The OCV accelerated test of the polymer electrolyte membrane was carried out to show that the average value of the fluorine release rate in the waste water from the start until 50 hours was 0.04 (μg/Hr/cm$^2$), which was a very low value. The cell had a lifetime of more than 1000 hours, showing extremely excellent durability. The results including the cross leak amount are shown in Table 2.

Example 6

There was prepared a 1% by mass diphenyl sulfide solution (solution [FS-4]) by diluting diphenyl (Wako Pure Chemical Industries, Ltd.) sulfide with ethanol.

Subsequently, after adding and mixing 16.3 g of the solution [C-1] to 100.0 g of the solution [A-2] prepared in the same manner as in Example 1, to the resulting solution were added 65.2 g of the solution [FS-4] and 31.9 g of the solution [A-1] in order while stirring to adjust so that the mass ratio (A/B/C) of the perfluorocarbon sulfonic acid resin (A component)/the compound having a thioether group (B component)/the polyazole-based compound (C component) was 96.5/1/2.5. The mixed solution was further subjected to vacuum concentration at 80° C., followed by distilling off part of ethanol and water to obtain a cast solution.

The cast solution was subjected to pressure filtration by placing a membrane filter AN1H04700 (with a pore diameter of 10.0 μm) produced by Millipore Corporation in a stainless steel line holder KS-47 manufactured by Advantec Mfs, Inc.

The resulting solution was casted in the same manner as in Example 1 to obtain a polymer electrolyte membrane having a membrane thickness of approximately 50 μm. Subsequently, the polymer electrolyte membrane was immersed in a 2N aqueous solution of hydrochloric acid at 60° C. for 3 hours, followed by washing with ion exchange water and drying to obtain a polymer electrolyte membrane (EW: 860, ion exchange capacity: 1.16).

The X component cumulative volume (volume basis) of the membrane having a particle diameter of 10 μm or more was 0%.

The OCV accelerated test of the polymer electrolyte membrane was carried out to show that the average value of the fluorine release rate in the waste water from the start until 50 hours was 0.05 (μg/Hr/cm$^2$), which was a very low value. The cell had a lifetime of more than 1000 hours, showing extremely excellent durability. The results including the cross leak amount are shown in Table 2.

Example 7

There was prepared a polyparaphenylene benzobisoxazole solution (solution [C-2]) by immersing 0.1 g of a polyparaphenylene benzobisoxazole (having a number average molecular weight of 1000), which was sufficiently pulverized, in a mixed solution of 1 g of an 8% by weight sodium hydroxide aqueous solution and 9.5 g of ethanol and followed by stirring for one hour while heating at 80° C. The mass ratio (A/B/C) of the perfluorocarbon sulfonic acid resin (A component)/the polyphenylene sulfide resin (B component)/the polyazole-based compound (C component) was adjusted so as to be 96.5/1/2.5 in the same manner as in Example 5 except for using the [C-2] instead of [C-1] in Example 5. The mixed solution was further subjected to vacuum concentration at 80° C., followed by distilling off part of ethanol and water to obtain a cast solution.

The cast solution was subjected to pressure filtration by placing a membrane filter AN1H04700 (with a pore diameter of 10.0 μm) produced by Millipore Corporation in a stainless steel line holder KS-47 manufactured by Advantec Mfs, Inc.

The resulting solution was casted in the same manner as in Example 1 to obtain a polymer electrolyte membrane having a membrane thickness of approximately 50 μm. Subsequently, the polymer electrolyte membrane was immersed in a 2N aqueous solution of hydrochloric acid at 60° C. for 3 hours, followed by washing with ion exchange water and drying to obtain a polymer electrolyte membrane (EW: 860, ion exchange capacity: 1.16).

The X component cumulative volume (volume basis) of the membrane having a particle diameter of 10 μm or more was 1%.

The OCV accelerated test of the polymer electrolyte membrane was carried out to show that the average value of the fluorine release rate in the waste water from the start until 50 hours was 0.06 (μg/Hr/cm$^2$), which was a very low value. The cell had a lifetime of more than 1000 hours, showing extremely excellent durability. The results including the cross leak amount are shown in Table 2.

Example 8

A porous membrane made of PVDF (Immobilon-P, produced by Millipore Corporation) was stretched two times in width and height by arbitrarily heating. The stretched PVDF membrane had a membrane thickness of approximately 20 μm, and the porosity of the porous membrane obtained from the area and weight was 92%.

The porous membrane was immersed five times in a mixed solution in which the mass ratio (A/B/C) of the perfluorocarbon sulfonic acid resin (A component) prepared in the same manner as in Example 6/the polyphenylene sulfide resin (B component)/the polyazole-based compound (C component) was 94.5/3/2.5 and then taken out, fixed on a metal frame and dried at 80° C. for 2 hours in a hot air oven, followed by further heat treating at 160° C. for one hour. After cooling, the membrane was removed from the metal frame and immersed in a 2N aqueous solution of hydrochloric acid at 60° C. for 3 hours, followed by washing with ion exchange water and drying to obtain a polymer electrolyte membrane (EW: 1100, ion exchange capacity: 0.91).

The X component cumulative volume (volume basis) of the membrane having a particle diameter of 10 μm or more was 1%.

The OCV accelerated test of the polymer electrolyte membrane was carried out to show that the average value of the fluorine release rate in the waste water from the start until 50 hours was 0.05 (μg/Hr/cm$^2$), which was a very low value. The cell had a lifetime of more than hours, showing extremely excellent durability. The results including the cross leak amount are shown in Table 2.

TABLE 2

| | Polymer Electrolyte Membrane Composition | | | | | | Ion | X Component | | OCV | | |
|---|---|---|---|---|---|---|---|---|---|---|---|---|
| | | | | | | | exchange | | | Fluorine Release Rate G | Cross Leak Amount L (ml × cm/ cm$^2$/sec/cmHg) | |
| | (%) | | | | | | EW | Capacity | Cumulative | Operation | (μg/Hr/cm$^2$) | Before |
| | A | B | C | D | E | Filtration | (g/eq) | (meq/g) | Volume (%) | Time (Hr) | 50 hr | Operation | 50 hr |
| Example 4 | 94.5 | 3 | 2.5 | 0 | 0 | Yes | 880 | 1.14 | 1 | >1000 | 0.03 | 0.5 × 10$^{-8}$ | 0.7 × 10$^{-8}$ |
| Example 5 | 96.5 | 1 | 2.5 | 0 | 0 | Yes | 860 | 1.16 | 1 | >1000 | 0.04 | 0.6 × 10$^{-8}$ | 0.9 × 10$^{-8}$ |

TABLE 2-continued

| | Polymer Electrolyte Membrane Composition (%) | | | | | | EW (g/eq) | Ion exchange Capacity (meq/g) | X Component Cumulative Volume (%) | OCV Operation Time (Hr) | Fluorine Release Rate G (µg/Hr/cm$^2$) 50 hr | Cross Leak Amount L (ml × cm/cm$^2$/sec/cmHg) Before Operation | Cross Leak Amount L 50 hr |
|---|---|---|---|---|---|---|---|---|---|---|---|---|---|
| | A | B | C | D | E | Filtration | | | | | | | |
| Example 6 | 96.5 | 1 | 2.5 | 0 | 0 | Yes | 860 | 1.16 | 0 | >1000 | 0.05 | 0.6 × 10$^{-8}$ | 1.0 × 10$^{-8}$ |
| Example 7 | 96.5 | 1 | 2.5 | 0 | 0 | Yes | 860 | 1.16 | 1 | >1000 | 0.06 | 0.6 × 10$^{-8}$ | 1.1 × 10$^{-8}$ |
| Example 8 | 94.5 | 3 | 2.5 | 0 | 0 | Yes | 1100 | 0.91 | 1 | >1000 | 0.05 | 0.6 × 10$^{-8}$ | 0.8 × 10$^{-8}$ |

Table 1 and Table 2 showed that all of the polymer electrolyte membranes of Examples 1 to 8 had an operation time of more than 1000 hours and extremely excellent durability and further had excellent performance in both the fluorine release rate and cross leak amount.

On the other hand, all of the polymer electrolyte membranes of Examples 1 to 8 had a very longer operation time and sufficient durability, as compared to the polymer electrolyte membranes of Comparative Example 4 prepared based on Patent Document 7 and the polymer electrolyte membranes of Comparative Examples 1 to 4 such as Comparative Example 2 prepared based on Patent Document 8.

Example 9

After adding and mixing 6.5 g of the solution [C-1] to 40.0 g of the solution [A-2] prepared in the same manner as in Example 1, to the resulting solution were added 78.2 g of the solution [FS-1] prepared in the same manner as in Example 1 and 38.9 g of the solution [A-1] in order while stirring to adjust so that the mass ratio (A/B/C) of the perfluorocarbon sulfonic acid resin (A component)/the polyphenylene sulfide resin (B component)/the polyazole-based compound (C component) was 96/3/1. The mixed solution was further subjected to vacuum concentration at 80° C., followed by distilling off part of ethanol and water to obtain an electrolyte polymer solution.

Using the electrolyte polymer solution thus obtained, an electrode catalyst layer was produced as follows.

After adding 2.76 g of the electrolyte polymer solution and 1.53 g of ethanol based on 0.70 g of Pt-supporting carbon (TEC10E40E, manufactured by Tanaka Kikinzoku Kogyo K. K, Pt: 36.4% by mass) so that the solid content was 20%, the resulting mixture was mixed by an ultrasonic homogenizer for one minute to obtain an electrode catalyst composition. The electrode catalyst composition was coated on a PTFE sheet by the screen printing method. After coating, the electrode catalyst composition was dried under room temperature for one hour and dried at 160° C. for one hour in the air. In this manner, there were obtained an electrode catalyst layer having a thickness of approximately 10 µm. Among these electrode catalyst layers, an electrode catalyst layer having a Pt supporting amount of 0.15 mg/cm$^2$ was used as an anode catalyst layer and an electrode catalyst layer having a Pt supporting amount of 0.30 mg/cm$^2$ was used as a cathode catalyst layer.

On the other hand, a polymer electrolyte membrane was produced as follows.

After uniformly spreading 35.3 g of the solution [A-1] on a glass petri dish with a diameter of 15 cm, the solution was dried at 80° C. for 2 hours on a hot plate, followed by heat treatment in a hot air oven at 180° C. for one hour to form a membrane. After cooling, the membrane was peeled off from the petri dish and immersed in a 2N aqueous solution of hydrochloric acid (produced by Wako Pure Chemical Industries, Ltd.) at 25° C. for 8 hours, followed by acid washing. Thereafter, the membrane was sufficiently washed with ion exchange water and then dried at 25° C. and 35% RH. In this manner, there was obtained a transparent and uniform polymer electrolyte membrane having a thickness of 50 µm.

The anode catalyst layer and cathode catalyst layer were faced each other. The polymer electrolyte membrane thus obtained was sandwiched between the anode and cathode catalyst layers and was hot-pressed at 180° C. and a surface pressure of 0.1 MPa, thereby transcribing and joining the anode and cathode catalyst layers to the polymer electrolyte membrane to prepare a membrane electrode assembly.

The OCV accelerated test of the membrane electrode assembly was carried out to show that the average value of the fluorine release rate in the waste water from the start until 50 hours was 1.12 (µg/Hr/cm$^2$), which was a very low value. The cell had a lifetime of more than 100 hours, showing extremely excellent durability. The results including the cross leak amount are shown in Table 3.

In addition, in the OCV accelerated test of the membrane electrode assembly in Examples 9 to 11, the anode and cathode catalyst layers correspond to the electrode catalyst layer and the gas diffusion electrode in the above-described method of the OCV accelerated test.

Example 10

After adding and mixing 16.3 g of the solution [C-1] to 100.0 g of the solution [A-2] prepared in the same manner as in Example 1, to the resulting solution were added 65.2 g of the solution [FS-2] prepared in the same manner as in Example 2 and 31.9 g of the solution [A-1] in order while stirring to adjust so that the mass ratio (A/B/C) of the perfluorocarbon sulfonic acid resin (A component)/the polyphenylene sulfide resin (B component)/the polyazole-based compound (C component) was 92.5/5/2.5. The mixed solution was further subjected to vacuum concentration at 80° C., followed by distilling off part of ethanol and water to obtain an electrolyte polymer solution.

The electrolyte polymer solution was subjected to pressure filtration by placing a membrane filter AN1H04700 (with a pore diameter of 10.0 µm) produced by Millipore Corporation in a stainless steel line holder KS-47 manufactured by Advantec Mfs, Inc.

By using the solution, there was prepared an electrode catalyst layer and a membrane electrode assembly in the same manner as in Example 9.

The OCV accelerated test of the membrane electrode assembly was carried out to show that the average value of the fluorine release rate in the waste water from the start until 50 hours was 1.06 (μg/Hr/cm$^2$), which was a very low value. The cell had a lifetime of more than 100 hours, showing extremely excellent durability. The results including the cross leak amount are shown in Table 3.

Example 11

After adding and mixing 16.3 g of the solution [C-1] to 100.0 g of the solution [A-2] prepared in the same manner as in Example 1, to the resulting solution were added 93.1 g of the solution [FS-3] prepared in the same manner as in Example 3 and 3.9 g of the solution [A-1] in order while stirring to adjust so that the mass ratio (A/B/C/D/E) of the perfluorocarbon sulfonic acid resin (A component)/the polyphenylene sulfide resin (B component)/the polyazole-based compound (C component)/the polyphenylene ether resin (D component)/the epoxy group-containing compound (E component) was 90.4/5/2.5/0.7/1.4. The mixed solution was further subjected to vacuum concentration at 80° C., followed by distilling off part of ethanol and water to obtain an electrolyte polymer solution.

The electrolyte polymer solution was subjected to pressure filtration in the same manner as in Example 10 to prepare an electrode catalyst layer and a membrane electrode assembly.

The OCV accelerated test of the membrane electrode assembly was carried out to show that the average value of the fluorine release rate in the waste water from the start until 50 hours was 1.07 (μg/Hr/cm$^2$), which was a very low value. The cell had a lifetime of more than 100 hours, showing extremely excellent durability. The results including the cross leak amount are shown in Table 3.

Comparative Example 5

There was prepared a uniform solution having a solid content concentration of 5% by mass in the same manner as in Example 1 except for singly using the perfluorosulfonic acid resin precursor (EW after hydrolysis and acid treatment: 730) obtained from tetrafluoroethylene and $CF_2=CFO(CF_2)_2-SO_2F$.

An electrode catalyst layer and a membrane electrode assembly were prepared in the same manner as in Example 9 by using the solution as an electrolyte polymer solution.

The OCV accelerated test of the membrane electrode assembly was carried out to show that the average value of the fluorine release rate in the waste water from the start until 50 hours was 8.50 (μg/Hr/cm$^2$), which was a very high value. The cell had a lifetime of 52 hours, and sufficient durability was not obtained. The results including the cross leak amount are shown in Table 3.

Table 3 showed that all of the electrode catalyst layers of Examples 9 to 11 had an operation time of more than 100 hours and extremely excellent durability, and had excellent performance in both the fluorine release rate and cross leak amount as a membrane electrode assembly due to the use of the electrode catalyst layers in Examples 9 to 11.

On the other hand, the electrode catalyst layer in Comparative Examples had a short operation time and had no sufficient durability.

From the above results, it was found that in the present embodiment, the durability is significantly increased by incorporating two components, a compound (B component) having a thioether group and a compound (C component) having an azole ring, into a polymer electrolyte composition, as compared to the case where each of the compounds is incorporated alone. As for the reason, it is believed that in an electrolyte membrane disclosed in Patent Document 8, platinum eluted or precipitated in the membrane cannot be securely inactivated by reduction or adsorption because the reactive area of a polyphenylene sulfide resin is not sufficiently large, and a sufficient durability is not obtained because the electrolyte component of the electrolyte membrane is degraded by the hydrogen peroxide generated on the platinum which cannot be trapped and peroxide radicals resulting from the hydrogen peroxide. Considering that platinum in the electrode catalyst is eluted and precipitated and hydrogen peroxide and peroxide radicals resulting from the hydrogen peroxide are generated in a chain reaction on the eluted platinum, it is believed that the durability is significantly increased by cutting the source of the peroxide radical generation pathway which leads to deterioration of the electrolyte component of the electrolyte membrane by incorporating both the compound having the thioether group and the compound having the azole ring and by using the supplementary function of the compound having the azole ring against hydrogen peroxide and peroxide radicals resulting from the hydrogen peroxide which cannot be prevented by Patent Document 8 disclosing that only a compound having a thioether group is incorporated. In addition, it was found that in order to effectively perform the function of the two components, the compound (B component) having the thioether group and the compound (C component) having the azole ring, the polymer electrolyte composition may have a high durability by controlling the two components in a specific dispersion state even under high-temperature low-humidification conditions where the elution and precipitation of platinum are frequently observed.

INDUSTRIAL APPLICABILITY

The polymer electrolyte composition having a high durability of the present invention has high chemical stability. In

TABLE 3

| | Electrode Catalyst Layer Composition (%) | | | | | | | Fluorine Release Rate G | Cross Leak Amount L (ml × cm/ cm$^2$/sec/cmHg) | |
|---|---|---|---|---|---|---|---|---|---|---|
| | | | | | | | OCV | | | |
| | A | B | C | D | E | Filtration | Operation Time (hr) | (μg/Hr/cm$^2$) 50 Hr | Before Operation | 50 Hr |
| Example 9 | 96 | 3 | 1 | 0 | 0 | No | >100 | 1.12 | $0.7 \times 10^{-8}$ | $3.1 \times 10^{-8}$ |
| Example 10 | 92.5 | 5 | 2.5 | 0 | 0 | Yes | >100 | 1.06 | $0.8 \times 10^{-8}$ | $3.2 \times 10^{-8}$ |
| Example 11 | 90.4 | 5 | 2.5 | 0.7 | 1.4 | Yes | >100 | 1.07 | $0.7 \times 10^{-8}$ | $3.0 \times 10^{-8}$ |
| Comparative Example 5 | 100 | 0 | 0 | 0 | 0 | No | 52 | 8.50 | $0.9 \times 10^{-8}$ | $3.0 \times 10^{-7}$ |

The invention claimed is:

1. A polymer electrolyte composition comprising:
   a polymer electrolyte (A component) having an ion exchange capacity of from 0.5 to 3.0 meq/g;
   a compound (B component) having a thioether group; and
   a compound (C component) having an azole ring, wherein a mass ratio (B/C) of the B component to the C component is 1/99 to 99/1 and a total content of the B component and C component is 0.01 to 50% by mass based on a solid content in the polymer electrolyte composition.

2. The polymer electrolyte composition according to claim 1, wherein the content of the B component is 0.005 to 30% by mass and the content of the C component is 0.005 to 20% by mass based on the solid content in the polymer electrolyte composition.

3. The polymer electrolyte composition according to claim 1 or 2, wherein the B component is a polyphenylene sulfide resin.

4. The polymer electrolyte composition according to claim 1 or 2, wherein the C component is a polyazole-based compound.

5. The polymer electrolyte composition according to claim 1 or 2, wherein the C component is one or two or more polyazole-based compounds selected from the group consisting of a polyimidazole-based compound, a polybenzimidazole-based compound, a polybenzobisimidazole-based compound, a polybenzoxazole-based compound, a polyoxazole-based compound, a polythiazole-based compound and a polybenzothiazole-based compound.

6. The polymer electrolyte composition according to claim 1 or 2, wherein the C component is a polybenzimidazole-based compound.

7. The polymer electrolyte composition according to claim 1 or 2, wherein the C component is poly[2,2'-(m-phenylene)-5,5'-bibenzimidazole].

8. The polymer electrolyte composition according to claim 1 or 2, wherein the A component is a perfluorocarbon polymer compound having a structural unit represented by the following general formula [1];

$$-[CF_2CX^1CX^2]_a-[CF_2-CF((-O-CF_2-CF(CF_2X^3))_b-O_c-(CFR^1)_d-(CFR^2)_e-(CF_2)_f-X^4)]_g- \quad [1]$$

(wherein each of $X^1$, $X^2$ and $X^3$ is independently selected from the group consisting of a halogen atom and a perfluoroalkyl group having 1 to 3 carbon atoms,
   $X^4$ represents COOZ, $SO_3Z$, $PO_3Z_2$ or $PO_3HZ$ (wherein Z represents a hydrogen atom, an alkali metal atom, an alkaline earth metal atom or amines ($NH_4$, $NH_3R_1$, $NH_2R_1R_2$, $NHR_1R_2R_3$, or $NR_1R_2R_3R_4$), and each of $R_1$, $R_2$, $R_3$ and $R_4$ is independently selected from the group consisting of an alkyl group and an arene group; when $X^4$ represents $PO_3Z_2$, Z may be the same or different),
   each of $R^1$ and $R^2$ is independently selected from the group consisting of a halogen atom, a perfluoroalkyl group or fluorochloroalkyl group having 1 to 10 carbon atoms,
   a and g are positive numbers satisfying $0 \leq a < 1$, $0 < g \leq 1$ and $a+g=1$,
   b is an integer of 0 to 8,
   c is 0 or 1, and
   each of d, e and f is independently an integer of 0 to 6 (with the proviso that d, e and f are simultaneously not 0)).

9. The polymer electrolyte composition according to claim 1 or 2, further comprising a polyphenylene ether resin (D component) and/or an epoxy group-containing compound (E component), and wherein a mass ratio (D/E) of the D component to the E component is 0/100 to 100/0 and a total content of the D component and the E component is 0.01 to 20% by mass based on the solid content in the polymer electrolyte composition.

10. The polymer electrolyte composition according to claim 1 or 2, wherein a resin comprising B component in a range from 50 to 100% by mass is dispersed in an island state and satisfies the following expression [2];

$0\% \leq$ cumulative volume, volume basis, of resin having a particle diameter of 10 μm or more $\leq 5\%$ [2].

11. The polymer electrolyte composition according to claim 10, wherein the resin has an average particle diameter of from 0.01 to 2.0 μm.

12. The polymer electrolyte composition according to claim 10, wherein the cumulative volume ratio (R1/R2) (volume basis) of a component (R1) having a particle diameter of less than 1 μm to a component (R2) having a particle diameter of 1 μm or more of the resin is 20/80 to 99/1.

13. A polymer electrolyte membrane formed from the polymer electrolyte composition according to claim 1 or 2.

14. A process for producing a polymer electrolyte membrane, comprising the steps of:
   dissolving or suspending a polymer electrolyte (A component) having an ion exchange capacity of from 0.5 to 3.0 meq/g, a compound (B component) having a thioether group and a compound (C component) having an azole ring in one or more protic solvents to obtain a polymer electrolyte composition in which a mass ratio (B/C) of the B component to the C component is from 1/99 to 99/1 and a total of the content of the B component and the C component is from 0.01 to 50% by mass based on the solid content in the polymer electrolyte composition;
   casting the polymer electrolyte composition; and
   removing the solvents to form a membrane.

15. The process for producing the polymer electrolyte membrane according to claim 14, comprising the steps of:
   (1) mixing the B component into a polymer electrolyte precursor followed by melt extrusion to obtain a molded product;
   (2) subjecting the molded product to hydrolysis treatment and further to acid treatment to convert the polymer electrolyte precursor into the A component;
   (3) dissolving or suspending the acid-treated molded product in the one or more protic solvents to obtain a solution or suspension containing the A component and the B component;
   (4) mixing together the solution or suspension obtained in the above step (3) and a solution or suspension of the C component to obtain the polymer electrolyte composition;
   (5) casting the polymer electrolyte composition; and
   (6) removing the solvents to form a membrane.

16. The process for producing the polymer electrolyte membrane according to claim 15, wherein the step (1) further comprises mixing a polyphenylene ether resin (D component) and/or an epoxy group-containing compound (E component).

17. The process for producing the polymer electrolyte membrane according to claim 15 or 16, further comprising filtering the solution or suspension obtained in the step (3).

18. A polymer electrolyte membrane obtained by the process according to any one of claims 14 to 16.

19. The polymer electrolyte membrane according to claim 13, further comprising a reinforcing material selected from the group consisting of an inorganic material, an organic material and an organic-inorganic hybrid material.

20. The polymer electrolyte membrane according to claim 19, wherein the reinforcing material is a fibrous material.

21. The polymer electrolyte membrane according to claim 19, wherein the reinforcing material is a continuous support.

22. A membrane electrode assembly comprising a polymer electrolyte membrane according to claim 13.

23. An electrode catalyst layer produced from an electrode catalyst composition comprising:
a composite particle in which an electrode catalyst particle is supported on a conductive particle and
a polymer electrolyte composition comprising:
a polymer electrolyte (A component) having an ion exchange capacity of from 0.5 to 3.0 meq/g,
a compound (B component) having a thioether group and
a compound (C component) having an azole ring,
wherein a content of the composite particle in the electrode catalyst layer is 20 to 95% by mass based on the electrode catalyst layer,
a mass ratio (B/C) of the B component to the C component is 1/99 to 99/1, and
a total content of the B component and the C component is 0.01 to 50% by mass based on the solid content in the polymer electrolyte composition.

24. The electrode catalyst layer according to claim 23, wherein the B component is a polyphenylene sulfide resin.

25. The electrode catalyst layer according to claim 23 or 24, wherein the C component is a polyazole-based compound.

26. The electrode catalyst layer according to claim 23 or 24, wherein the C component is a polyazole salt.

27. The electrode catalyst layer according to claim 23 or 24, wherein the C component is one or two or more polyazole-based compounds selected from the group consisting of a polyimidazole-based compound, a polybenzimidazole-based compound, a polybenzobisimidazole-based compound, a polybenzoxazole-based compound, a polyoxazole-based compound, a polythiazole-based compound and a polybenzothiazole-based compound.

28. The electrode catalyst layer according to claim 23 or 24, wherein the C component is a polybenzimidazole-based compound.

29. The electrode catalyst layer according to claim 23 or 24, wherein the C component is poly[2,2'-(m-phenylene)-5,5'-bibenzimidazole].

30. The electrode catalyst layer according to claim 23 or 24, wherein the A component is a perfluorocarbon polymer compound having a structural unit represented by the following general formula [1];

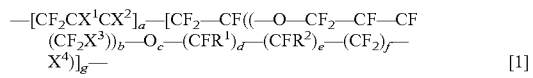

[1]

(wherein each of $X^1$, $X^2$ and $X^3$ is independently selected from the group consisting of a halogen atom and a perfluoroalkyl group having 1 to 3 carbon atoms,
$X^4$ represents $COOZ$, $SO_3Z$, $PO_3Z_2$ or $PO_3HZ$ (wherein Z represents a hydrogen atom, an alkali metal atom, an alkaline earth metal atom or amines ($NH_4$, $NH_3R_1$, $NH_2R_1R_2$, $NRH_1R_2R_3$, or $NR_1R_2R_3R_4$), and
each of $R_1$, $R_2$, $R_3$ and $R_4$ is independently selected from the group consisting of an alkyl group and an arene group; when $X^4$ represents $PO_3Z_2$, Z may be the same or different),
each of $R^1$ and $R^2$ is independently selected from the group consisting of a halogen atom, a perfluoroalkyl group or fluorochloroalkyl group having 1 to 10 carbon atoms,
a and g are positive numbers satisfying $0 \leq a < 1$, $0 < g \leq 1$ and $a+g=1$,
b is an integer of 0 to 8,
c is 0 or 1, and
d, e and f are each independently an integer of 0 to 6 (with the proviso that d, e and f are simultaneously not 0)).

31. The electrode catalyst layer according to claim 23 or 24, further comprising a polyphenylene ether resin (D component) and/or an epoxy group-containing compound (E component), and wherein a mass ratio (D/E) of the D component to the E component is 0/100 to 100/0, and a total content of the D component and the E component is 0.01 to 20% by mass based on the solid content in the polymer electrolyte composition.

32. A process for producing an electrode catalyst layer, comprising the steps of:
dissolving or suspending a polymer electrolyte (A component) having an ion exchange capacity of from 0.5 to 3.0 meq/g, a compound (B component) having a thioether group and a compound (C component) having an azole ring in one or more protic solvents to obtain a polymer electrolyte composition in which a mass ratio (B/C) of the B component to the C component is 1/99 to 99/1 and a total content of the B component and the C component is 0.01 to 50% by mass based on the solid content in the polymer electrolyte composition;
preparing an electrode catalyst composition in which a composite particle where an electrode catalyst particle is supported on a conductive particle is dispersed in the polymer electrolyte composition at a ratio of from 1 to 100% by mass based on the polymer electrolyte composition; and
drying and solidifying the electrode catalyst composition.

33. An electrode catalyst layer obtained by the process according to claim 32.

34. A polymer electrolyte solution or a polymer electrolyte suspension comprising a polymer electrolyte (A component) having an ion exchange capacity of from 0.5 to 3.0 meq/g, a compound (B component) having a thioether group and a compound (C component) having an azole ring, wherein the A component, the B component and the C component are dissolved or suspended in one or more protic solvents, a mass ratio (B/C) of the B component to the C component is 1/99 to 99/1 and a total content of the B component and the C component is 0.01 to 50% by mass based on the solid contents in the polymer electrolyte solution or the polymer electrolyte suspension.

35. The polymer electrolyte solution or the polymer electrolyte suspension according to claim 34, wherein a resin composed mainly of the B component having an average particle diameter of from 0.01 to 2.0 μm is dispersed.

36. The polymer electrolyte solution or polymer electrolyte suspension according to claim 34 or 35, wherein the A component is a perfluorocarbon polymer compound having a structural unit represented by the following general formula [1];

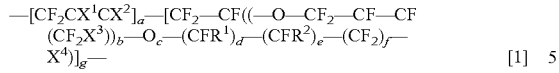
[1]

(wherein each of $X^1$, $X^2$ and $X^3$ is independently selected from the group consisting of a halogen atom and a perfluoroalkyl group having 1 to 3 carbon atoms, $X^4$ represents COOZ, $SO_3Z$, $PO_3Z_2$ or $PO_3HZ$ (wherein Z represents a hydrogen atom, an alkali metal atom, an alkaline earth metal atom or amines ($NH_4$, $NH_3R_1$, $NH_2R_1R_2$, $NHR_1R_2R_3$, or $NR_1R_2R_3R_4$), and each of $R_1$, $R_2$, $R_3$ and $R_4$ is independently selected from the group consisting of an alkyl group and an arene group; when $X^4$ represents $PO_3Z_2$, Z may be the same or different), each of $R^1$ and $R^2$ is independently selected from the group consisting of a halogen atom, a perfluoroalkyl or fluorochloroalkyl group having 1 to 10 carbon atoms, a and g are positive numbers satisfying $0 \leq a < 1$, $0 < g \leq 1$ and $a+g=1$, b is an integer of 0 to 8, c is 0 or 1, and d, e and f are each independently an integer of 0 to 6 (with the proviso that d, e and f are simultaneously not 0)).

37. A membrane electrode assembly comprising the electrode catalyst layer according to claim 23 or 33.

38. A membrane electrode assembly comprising
(a) a polymer electrolyte membrane formed from the polymer electrolyte composition according to claim 1 or 2, and
(b) an electrode catalyst layer comprising:
a composite particle in which an electrode catalyst particle is supported on a conductive particle and
a polymer electrolyte composition comprising: a polymer electrolyte (A component) having an ion exchange capacity of from 0.5 to 3.0 meq/g, a compound (B component) having a thioether group and a compound (C component) having an azole ring,
wherein a content of the composite particle in the electrode catalyst layer is 20 to 95% by mass based on the electrode catalyst layer,
a mass ratio (B/C) of the B component to the C component is 1/99 to 99/1, and
a total content of the B component and the C component is 0.01 to 50% by mass based on the solid content in the polymer electrolyte composition.

39. A solid polymer electrolyte-based fuel cell comprising the membrane electrode assembly according to claim 22.

40. A solid polymer electrolyte-based fuel cell comprising the membrane electrode assembly according to claim 37.

* * * * *